United States Patent
Lee et al.

(10) Patent No.: US 10,869,079 B2
(45) Date of Patent: *Dec. 15, 2020

(54) APPARATUS AND CONTROL METHOD FOR DISPLAYING CONTENT OF PERIPHERAL DEVICE

(71) Applicant: SAMSUNG ELECTRONICS CO., LTD., Suwon-si (KR)

(72) Inventors: Hae-Kwang Lee, Seoul (KR); Hyung-joon Kim, Suwon-si (KR); Dong-ryun Seok, Seoul (KR); Cheul-hee Hahm, Seongnam-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,298

(22) Filed: Mar. 29, 2019

(65) Prior Publication Data

US 2019/0230403 A1 Jul. 25, 2019

Related U.S. Application Data

(63) Continuation of application No. 15/697,813, filed on Sep. 7, 2017.

(30) Foreign Application Priority Data

Sep. 27, 2016 (KR) .................... 10-2016-0124192

(51) Int. Cl.
*H04N 21/422* (2011.01)
*H04N 21/4363* (2011.01)
(Continued)

(52) U.S. Cl.
CPC ....... *H04N 21/42208* (2013.01); *H04L 12/12* (2013.01); *H04L 45/74* (2013.01);
(Continued)

(58) Field of Classification Search
CPC ............ G08C 2201/92; G08C 2201/93; H04N 21/43635; H04N 21/43615; H04N 21/42221; H04N 21/42225; H04N 5/4403
See application file for complete search history.

(56) References Cited

U.S. PATENT DOCUMENTS 7,814,516 B2 10/2010 Stecyk et al.
8,068,184 B2 11/2011 Hicks
(Continued)

FOREIGN PATENT DOCUMENTS

CN 102123257 A 7/2011
CN 102769724 A 11/2012
(Continued)

OTHER PUBLICATIONS

Communication dated Apr. 17, 2019, from the European Patent Office in counterpart European Application No. 17188817.5.
(Continued)

*Primary Examiner* — Brian T Misiura
(74) *Attorney, Agent, or Firm* — Sughrue Mion, PLLC

(57) ABSTRACT

A display apparatus for controlling a peripheral device and a method thereof are provided. The method may include transmitting, to a remote controller, a first turn-on signal to turn on the peripheral device; measuring a time interval between a first time when the display apparatus transmits the first turn-on signal to the remote controller and a second time when the display apparatus starts to receive content from the peripheral device in response to the first turn-on signal; and setting the measured time interval as a threshold time to determine whether the content is received from the peripheral device.

18 Claims, 15 Drawing Sheets

(51) Int. Cl.
  *H04N 21/443* (2011.01)
  *H04N 21/41* (2011.01)
  *H04L 12/12* (2006.01)
  *H04L 12/741* (2013.01)
  *H04N 21/47* (2011.01)
  *H04N 5/63* (2006.01)
  *H04N 5/44* (2011.01)
  *G08C 23/04* (2006.01)

(52) U.S. Cl.
  CPC . *H04N 21/41265* (2020.08); *H04N 21/42204* (2013.01); *H04N 21/43635* (2013.01); *H04N 21/4432* (2013.01); *H04N 21/47* (2013.01); *G08C 23/04* (2013.01); *G08C 2201/20* (2013.01); *G08C 2201/21* (2013.01); *H04N 5/63* (2013.01); *H04N 2005/4407* (2013.01)

(56) References Cited

U.S. PATENT DOCUMENTS

| | | |
|---|---|---|
| 8,079,055 B2 | 12/2011 | Hardacker et al. |
| 8,286,210 B2 | 10/2012 | Boyden et al. |
| 8,364,868 B2 | 1/2013 | Higuchi et al. |
| 8,375,150 B2 | 2/2013 | Guillerm et al. |
| 8,745,024 B2 | 6/2014 | Chardon et al. |
| 8,749,716 B2 | 6/2014 | Burns et al. |
| 8,793,415 B2 | 7/2014 | Higuchi et al. |
| 9,086,720 B1 | 7/2015 | Garg |
| 9,098,163 B2 | 8/2015 | Kuo et al. |
| 9,124,917 B2 | 9/2015 | Ahn |
| 9,179,175 B2 | 11/2015 | Kim et al. |
| 9,226,020 B2 | 12/2015 | Kim et al. |
| 9,235,257 B2 | 1/2016 | Richardson |
| 9,407,950 B2 | 8/2016 | Natani et al. |
| 9,601,006 B2 | 3/2017 | Evans |
| 9,640,067 B1 * | 5/2017 | Scalise ............... G08C 19/00 |
| 9,686,496 B2 | 6/2017 | Schafer et al. |
| 9,723,350 B2 | 8/2017 | Kim et al. |
| 9,800,818 B2 | 10/2017 | Arling et al. |
| 9,886,233 B2 | 2/2018 | Innes et al. |
| 10,425,568 B2 | 9/2019 | Kim et al. |
| 2004/0125080 A1 | 7/2004 | Ha et al. |
| 2008/0151127 A1 | 6/2008 | Ryou |
| 2008/0271099 A1 | 10/2008 | Ohga et al. |
| 2010/0146579 A1 | 6/2010 | Reams et al. |
| 2011/0156944 A1 | 6/2011 | Ward et al. |
| 2011/0164181 A1 | 7/2011 | Higuchi et al. |
| 2012/0242905 A1 | 9/2012 | Inoue et al. |
| 2012/0274863 A1 | 11/2012 | Chardon et al. |
| 2012/0307157 A1 | 12/2012 | Utsunomiya |
| 2012/0311654 A1 | 12/2012 | Dougherty, III et al. |
| 2013/0005250 A1 | 1/2013 | Kim et al. |
| 2013/0024709 A1 | 1/2013 | Park et al. |
| 2013/0088643 A1 | 4/2013 | Lee |
| 2013/0117478 A1 | 5/2013 | Higuchi et al. |
| 2013/0136131 A1 | 5/2013 | Hirai |
| 2013/0271659 A1 | 10/2013 | Na et al. |
| 2014/0118618 A1 | 5/2014 | Ranatunga |
| 2014/0132839 A1 | 5/2014 | Chang et al. |
| 2014/0132844 A1 | 5/2014 | Burns et al. |
| 2014/0250172 A1 | 9/2014 | Higuchi et al. |
| 2014/0337879 A1 | 11/2014 | Arling et al. |
| 2015/0179061 A1 | 6/2015 | Kim et al. |
| 2016/0070590 A1 | 3/2016 | Eicher et al. |
| 2017/0048577 A1 | 2/2017 | Chiou et al. |
| 2018/0054557 A1 | 2/2018 | Kim et al. |
| 2018/0091845 A1 | 3/2018 | Lee et al. |
| 2018/0091851 A1 | 3/2018 | Bae |
| 2018/0143838 A1 | 5/2018 | Seo et al. |

FOREIGN PATENT DOCUMENTS

| | | |
|---|---|---|
| CN | 102890555 A | 1/2013 |
| CN | 107770470 A | 3/2018 |
| EP | 0964336 A2 | 12/1999 |
| EP | 3285494 A1 | 2/2018 |
| JP | 2010-263536 A | 11/2010 |
| JP | 2014-183430 A | 9/2014 |
| JP | 5821576 B2 | 11/2015 |
| KR | 10-0513281 B1 | 9/2005 |
| KR | 10-1049251 B1 | 7/2011 |
| KR | 10-1300949 B1 | 8/2013 |
| KR | 10-1488994 B1 | 2/2015 |
| KR | 10-2015-0071944 A | 6/2015 |

OTHER PUBLICATIONS

International Search Report and Written Opinion (PCT/ISA/210 and PCT/ISA/237), dated Dec. 11, 2017 by International Searching Authority in International Application No. PCT/KR2017/009805.
Communication dated Feb. 13, 2017, from the European Patent Office in counterpart European Application No. 17188817.5.
Communication dated Sep. 10, 2019, issued by the European Patent Office in counterpart European Application No. 17188817.5.
Communication dated Sep. 27, 2019 issued by the State Intellectual Property Office of P.R. China in counterpart Chinese Application No. 201710887972.0.

* cited by examiner

APPARATUS AND CONTROL METHOD FOR DISPLAYING CONTENT OF PERIPHERAL DEVICE

CROSS-REFERENCE TO RELATED APPLICATIONS

This application is a continuation of U.S. patent application Ser. No. 15/697,813, filed on Sep. 7, 2017, in the U.S. Patent and Trademark Office, and claims priority from Korean Patent Application No. 10-2016-0124192, filed on Sep. 27, 2016, in the Korean Intellectual Property Office, the disclosures of which are incorporated herein by reference in their entireties.

BACKGROUND

1. Field

Apparatuses and methods consistent with exemplary embodiments relate to a controlling a peripheral device connected to a display apparatus and, more particularly, to controlling the peripheral device based on the booting time of the peripheral device.

2. Description of the Related Art

With development of technology, an electronic apparatus may provide various services and functions including phone call, data transmission, and multitasking functions.

The display apparatus may be connected to various peripheral devices such as a set-top box, a DVD player, and a home theater, and may receive and output contents provided by the respective peripheral devices.

In order to receive contents from various peripheral devices, a user may control the operation of each peripheral device by using a remote controller for controlling each peripheral device.

Recently, an integrated remote controller capable of controlling a display apparatus and a peripheral device in an integrated manner has been developed. Therefore, a user may control operations of a display apparatus and a peripheral device which is connected to the display apparatus through the integrated remote controller.

Particularly, it is possible to control power of a display apparatus and a peripheral device connected to the display apparatus through the integrated remote controller. That is, the display apparatus may boot the operating system of the display apparatus according to a turn-on command received from the integrated remote controller, and may transmit a turn-on signal for turning on the peripheral device to the integrated remote controller when the booting is completed. Accordingly, the integrated remote controller transmits, to the peripheral device, an infrared (IR) signal with respect to a control command included in the turn-on signal received from the display apparatus, and the peripheral device can perform the process of booting the operating system of the peripheral device according to the IR signal received from the integrated remote controller However, when the display apparatus and the peripheral device are controlled by the related-art integrated remote controller, the display apparatus may not recognize that the peripheral device is being booted according to the IR signal received from the integrated remote controller. Instead, the display apparatus may determine that the power of the peripheral device is turned off and may provide a user interface (UI) for controlling power of the peripheral device.

Since the boot time of all the peripheral devices is not the same, if the peripheral device requires a long boot time, the display apparatus may determine that the power of the peripheral device is turned off even though the peripheral device is booting its operating system, thereby providing a power-related UI of the corresponding peripheral device.

Accordingly, upon receiving a user request, the integrated remote controller may retransmit a related IR signal to the peripheral device while the peripheral device is booting its operating system, and therefore the peripheral device may reboot the operating system according to the IR signal retransmitted from the integrated remote controller. Therefore, there may be a problem that, it takes a long time for contents provided by the peripheral device to be output through the display apparatus, and the user may erroneously perceive that the peripheral device is malfunctioning even though the peripheral device is operating normally.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display apparatus and a method of the display apparatus that allow a user to correctly grasp an operation state of a peripheral device connected to the display apparatus based on a predetermined learning time.

Further, one or more exemplary embodiments provide a display apparatus and a method of the display apparatus that minimize the time required for content provided from a peripheral device to be output through the display apparatus by performing a control operation corresponding to an operation state of the peripheral device.

According to an aspect of an exemplary embodiment, there is provided a controlling method of a display apparatus for displaying content provided from a peripheral device, the method including: transmitting, to a remote controller, a first turn-on signal to turn on the peripheral device; measuring a time interval between a first time when the display apparatus transmits the first turn-on signal to the remote controller and a second time when the display apparatus starts to receive content from the peripheral device in response to the first turn-on signal; and setting the measured time interval as a threshold time to determine whether the content is received from the peripheral device.

The controlling method may further include: determining a power state of the peripheral device, in response to receiving a predetermined signal from the remote controller, after the threshold time is set; and turning on the peripheral device, in response to determining the power state of the peripheral device as a power off state.

The turning on the peripheral device may include: in response to determining that the display apparatus is capable of controlling the peripheral device through high definition multimedia interface consumer electronics control (HDMI CEC) and the power state of the peripheral device is the power off state, transmitting a second turn-on signal to the peripheral device through the HDMI CEC; and determining whether the content is received from the peripheral device during the threshold time.

The controlling method may further include: in response to the content being received from the peripheral device during the threshold time, updating the threshold time based on a time interval between a first point of time when the second turn-on signal is transmitted to the peripheral device and a second point of time when the content is received in response to the second turn-on signal.

The turning on the peripheral device may include, in response to content not being received from the peripheral device during the threshold time, transmitting the second turn-on signal for turning on the peripheral device to the remote controller, wherein the method may further include: determining whether the content is received from the peripheral device during the threshold time after the second turn-on signal is transmitted to the remote controller; and in response to the content being received from the peripheral device within the threshold time, updating the threshold time based on a time interval between a first point of dine when the second turn-on signal is transmitted to the peripheral device and a second point of time when the content is received.

The controlling method may further include: in response to the content not being received from the peripheral device within the threshold time, displaying a user interface (UI) for controlling an operation of the peripheral device.

The turning on the peripheral device may include, in response to determining that the display apparatus is not capable of controlling the peripheral device and the power state of the peripheral device is the power off state, transmitting a second turn-on signal to turn on the peripheral device to the remote controller. The method may further include: after the second turn-on signal is transmitted to the remote controller, determining whether the content is received from the peripheral device during the threshold time; and in response to the content being received from the peripheral device within the threshold time, updating the threshold time based on a time interval between a third dine when the second turn-on signal is transmitted to the remote controller and a fourth time when the content is received in response to the second turn-on signal.

The second turn-on signal which is transmitted to the remote controller may be converted to a value to be transmitted from the remote controller to the peripheral device as an infrared (IR) signal.

The predetermined signal may be one of a signal for turning on the display apparatus or a signal for switching a source device which provides the content to be outputted through the display apparatus.

The determining the power state of the peripheral device may include, in response to the content not being received from the peripheral device within the threshold time after receiving the predetermined signal or a voltage value of power which is supplied to the peripheral device after receiving the predetermined signal being less than a predetermined threshold voltage value, determining that the power state of the peripheral device is the power off state.

According to an aspect of another exemplary embodiment, there is provided a display apparatus including: a first communication interface configured to communicate with a peripheral device which provides content; a second communication interface configured to communicate with a remote controller which controls the display apparatus and the peripheral device; an output interface configured to output the content received from the peripheral device; and a processor configured to transmit, to a remote controller, a first turn-on signal to turn on the peripheral device and measure a time interval between a first time when the first turn-on signal is transmitted and a second time when the content is received from the peripheral device in response to the first turn-on signal, and set a threshold time to determine whether the content is received from the peripheral device.

The processor, in response to receiving the predetermined signal from the remote controller through the second communication interface after the threshold time is set, may determine a power state of the peripheral device, and in response to determining the power state of the peripheral device as a power off state, may perform a control operation to turn on the peripheral device.

In response to determining that the display apparatus is capable of controlling the peripheral device through high definition multimedia interface consumer electronics control (HDMI CEC), and the power state of the peripheral device is the power off state, the processor may transmit a second turn-on signal to the peripheral device through the HDMI CEC, and may determine whether the content is received from the peripheral device during the threshold time.

The display apparatus may further include: a storage configured to store the threshold wherein in response to the content being received from the peripheral device during the threshold time, the processor may update the threshold time based on a time interval between a first point of time when the second turn-on signal is transmitted to the peripheral device and a second point of time when the content is received, and may store the updated threshold time in the storage.

The display apparatus may further include: a storage configured to store the threshold time, wherein the processor, in response to the content not being received from the peripheral device during the threshold time, may transmit the second turn-on signal for turning on the peripheral device to the remote controller, may determine whether the content is received from the peripheral device during the threshold time after the second turn-on signal is transmitted to the remote controller, and in response to the content being received from the peripheral device within the threshold time, may update the threshold time based on a time interval between a first point of time when the second turn-on signal is transmitted to the peripheral device and a second point of time when the contents received, and may store the updated threshold time in the storage.

The processor, in response to the content not being received from the peripheral device within the threshold time, may control an output interface display a user interface (UI) for controlling an operation of the peripheral device.

The display apparatus may further include: a storage configured to store the threshold time, wherein the processor, in response to determining that the display apparatus not being capable of controlling the peripheral device and a power state of the peripheral device is off, transmits, to the remote controller, a second turn-on signal to turn on the peripheral device, determines whether the content is received from the peripheral device during the threshold time, and in response to the content being received from the peripheral device within the threshold time, updates the threshold time based on a time interval between a third time when the second turn-on signal to the remote controller and a fourth time when the content is received in response to the second turn-on signal, and stores the updated threshold time in the storage.

The second turn-on signal which is transmitted to the remote controller may be converted to a value to be transmitted from the remote controller to the peripheral device as an infrared (IR) signal. The predetermined signal may be one of a signal for turning on the display apparatus or a signal for switching a source device which provides the content to be outputted through the display apparatus.

The processor, in response to the content not being received from the peripheral device within the threshold time after receiving the predetermined signal or a voltage value of power which is supplied to the peripheral device after receiving the predetermined signal being less than a predetermined threshold voltage value, may determine that the power state of the peripheral device is the power off state.

According to an aspect of another exemplary embodiment, there is provide a controlling method of a display apparatus for displaying content provided from a peripheral device, including: in response to being communicatively connected to the peripheral device, receiving identification information on the peripheral device form the peripheral device; transmitting the received identification information to an external server; receiving, from the external server, a threshold time to determine whether content is received from the peripheral device; in response to receiving a predetermined signal being received from a remote controller after receiving the threshold time, determining a power state of the peripheral device; in response to the power state of the peripheral device being a power-off state, transmitting, to the remote controller, a turn-on signal to turn on the peripheral device; and updating the threshold time based on a time interval between a time of transmitting the turn-on signal and a time of receiving the content from the peripheral device.

According to an aspect of another exemplary embodiment, there is provided a display apparatus connected to a peripheral device, including: a storage that stores a threshold time; a communication interface configured to connect the display apparatus to the peripheral device and a remote controller; and a processor configured to: determine that a turn-on signal is received from the remote controller, the turn-on signal comprising a command for booting an operating system of the peripheral device; control the communication interface to transmit the turn-on signal to the peripheral device; store, in the storage, a first time when the turn-on signal is transmitted to the peripheral device; upon receipt of a response signal from the peripheral device that corresponds to the turn-on signal, measure a time interval between the first time and a second time when the response signal is received from the peripheral device; and determine whether the operating system of the peripheral device is being booted based on a comparison between the stored threshold time and the measured time interval.

The processor may be further configured to stop transmitting a subsequent turn-on signal to the peripheral device in response to determining that the operating system of the peripheral device is being booted.

The response signal may include any one or a combination of a content to be displayed on the display apparatus and an acknowledgement indicating that the peripheral device has recited the turn-on signal.

According to the exemplary embodiments, the display device may correctly determine the operation state of the peripheral device connected to the display device based on the predetermined learning time. In addition, the display device may perform a control operation corresponding to the operation state of the peripheral device, thereby minimizing the time required for contents provided in the peripheral device to be outputted through the display device.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
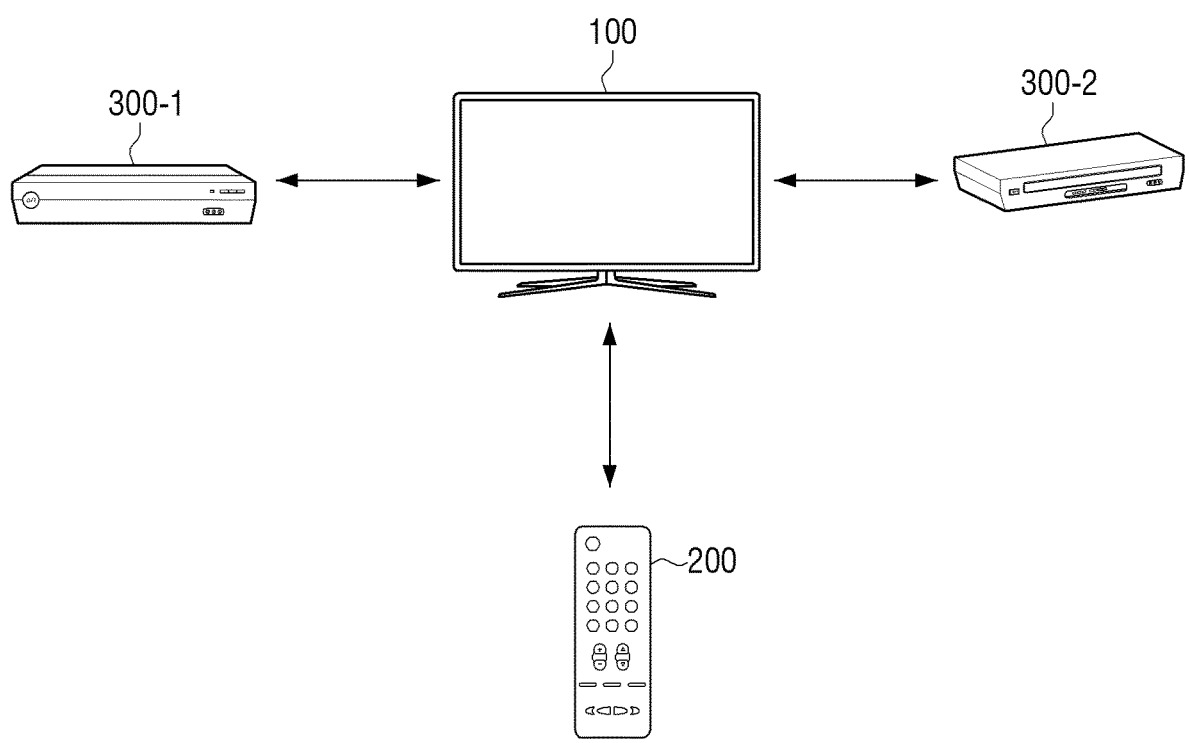
FIG. 1 illustrates a system for controlling an operation of a peripheral device which provides content to a display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor.

FIG. 1 illustrates a system for controlling an operation of a peripheral device which provides content to a display apparatus according to an exemplary embodiment.

As illustrated in FIG. 1, the system includes a display apparatus 100, a remote controller 200, and one or more peripheral devices 300-1 and 300-2.

The display apparatus 100 receives and outputs contents provided from one or more peripheral devices 300-1 and 300-2 connected by wire or wireless communication. Such a display apparatus 100 may be, for example, a smart TV, a smart phone, or the like. The remote controller 200 may be an integrated remote controller for controlling the one or more peripheral devices 300-1 and 300-2 connected to the display apparatus 100 and the display apparatus 100 in a wired or wireless manner according to a user command.

The one or more peripheral devices 300-1 and 300-2 communicates with at least one of the display apparatus 100 and the remote controller 200 in a wired or wireless manner and displays content received from the content server or a prestored content to the display apparatus 100. The one or more peripheral devices 300-1 and 300-2 may include, for example, a set top box, content reproducing device, a home theater, or the like. Specifically, when a user command is input, the remote controller 200 transmits a signal corresponding to the input user command to the display apparatus 100. Accordingly, the display apparatus 100 performs an operation corresponding to the predetermined signal received from the remote controller 200.

Here, the predetermined signal may be a signal for turning on the power of the display apparatus 100 or a signal for changing the source device providing the content. However, the present exemplary embodiment is not limited thereto, and the predetermined signal may be a signal for changing a broadcast channel or adjusting image quality for an image. For example, when the power of the display apparatus 100 is turned off, the remote controller 200 transmits a turn-on control signal for turning on the power of the display apparatus 100 to the display apparatus 100. When the control signal is received, the display apparatus 100 may perform a system boot by performing a turn-on operation according to a control signal received from the remote controller 200.

As another example, the display apparatus 100 may be communicatively connected to a first peripheral device 300-1 and a second peripheral device 300-2. Here, the first peripheral device 300-1 may be a set-top box receiving content provided by a content server and outputting the received content to the display apparatus 100, and the second peripheral device 300-2 may be a content reproducing device for providing content recorded on a storage medium such as a DVD. The display apparatus 100 may output the content provided from the first peripheral device 300-1.

While the content provided from the first peripheral device 300-1 is being output, the remote controller 200 may transmit a control signal to the display apparatus 100 to change the content source from the first peripheral device 300-1 to the second peripheral device 300-2. When the control signal is received, the display apparatus 100 stops outputting the content of the first peripheral device 300-1 according to the control signal received from the remote controller 200, change the content source to the second peripheral device 300-2, and output the content provided from the second peripheral device 300-2.

The display apparatus 100 performing an operation according to a predetermined signal received from the remote controller 200 sets a threshold time to determine whether or not the contents are received from each of the first and second peripheral devices 300-1 and 300-2 which are connected with the display apparatus 100 in a wired or wireless manner.

The display apparatus 100 may set a threshold time to determine whether content is received from the first peripheral device 300-1.

According to an exemplary embodiment, the display apparatus 100, when connected to the first peripheral device 300-1 for the first time, receives identification information from the first peripheral device 300-1 with respect to the first peripheral device 300-1. Then, the display apparatus 100 may transmit identification regarding the first peripheral device 300-1 to an external server, and receive and store a threshold time regarding the first peripheral device 300-1 from the external server.

According to another embodiment, the display apparatus 100 performs a turn-on operation according to a control signal received from the remote control apparatus 100 in a state in which the threshold time for determining whether or not the content is received is not yet set. When the system is booted, the display apparatus 100 transmits a turn-on signal for turning on the first peripheral device 300-1 to the remote controller 200.

Then, the display apparatus 100 may determine the time which is required after transmitting a turn-on signal to turn on the first peripheral device 300-1 to the remote controller 200 to receiving content from the system booted first peripheral device 300-1 which is turned on according to a control command of the remote control device 200 as the threshold time to determine whether content is received from the first peripheral device 300-1.

Specifically, when the system is booted, the display apparatus 100 transmits a turn-on signal for turning on the first peripheral device 300-1 to the remote controller 200. The remote controller 200 converts the turn-on signal received from the display apparatus 100 into an infrared (IR) signal and transmits the IR signal to the first peripheral device 300-1. In turn, the first peripheral device 300-1 is turned on according to the IR signal received from the remote controller 200 to boot the system of the peripheral device 300-1. When the system booting is completed, the first peripheral device 300-1 transmits content to the display apparatus 100.

Accordingly, the display apparatus 100 may set a time interval between a first time when the display apparatus 100 transmits, to the remote controller 200, a turn-on signal to turn on the first peripheral device 300-1 and a second time when the display apparatus 100 receives content from the turned-on and system-booted first peripheral device 300-1 according to a control command of the remote controller 200, as the threshold time, in order to determine whether content is received.

The display apparatus 100 may set a threshold time of the second peripheral device 300-2 through the aforementioned operations, and the display apparatus 100 may store the threshold times which respectively corresponds to the first peripheral device 300-1 and the second peripheral device 300-2.

When the threshold times are set and stored, the display apparatus 100 may update the threshold times according to whether content is received with the threshold times from the first and second peripheral devices 300-1 and 300-2.

Specifically, after the threshold times are set, when the display apparatus 100 receives a predetermined signal from the remote controller 200, the display apparatus 100 determines a power state of a peripheral device which is set as a source device to receive content, between the first peripheral device 300-1 and the second peripheral device 300-2. For example, the peripheral device set as the source device to receive the content from the display apparatus 100 may be the first peripheral device 300-1.

In this case, the display apparatus 100, when a preset signal is received from the remote controller 200, determines a power state of the first peripheral device 300-1.

According to an exemplary embodiment, the display apparatus 100, after a preset signal is received from the remote controller 200, determines whether content is received from the first peripheral device 300-1 which is connected to the display apparatus 100 during the threshold time set for the first peripheral device 300-1.

As a result of determination, when content is not received within threshold time, the display apparatus 100 may determine that power of the first peripheral device 300-1 which is connected to the display apparatus 100 is turned off.

According to another exemplary embodiment, the display apparatus 100, when a preset signal is received from the remote controller 200, compares a voltage value with respect to power supplied to the first peripheral device 300-1 connected to the display apparatus 100 with a predetermined threshold voltage value. As a result of the comparison, when the voltage value of power supplied to the first peripheral device 300-1 is less than the predetermined threshold voltage value, the display apparatus 100 may determine that power of the first peripheral device 300-1 which is connected to the display apparatus 100 is turned off.

If it is determined that the power of the first peripheral device 300-1 is off, the display apparatus 100 may transmit a turn-on signal to turn on the first peripheral device 300-1 which is determined to be turned off to the remote controller 200.

According to an exemplary embodiment, if the first peripheral device 300-1 is determined as not being controllable, and the power of the first peripheral device 300-1 is determined as being turned off, the display apparatus 100 transmits a turn-on signal to turn on the first peripheral device 300-1, to the remote controller 200.

The remote controller 200 converts the turn-on signal received from the display apparatus 100 into an IR signal and transmits the IR signal to the first peripheral device 300-1. Accordingly, the first peripheral device 300-1 may perform the system boot by performing the turn-on operation according to the IR signal received from the remote turn controller 200.

Thereafter, when the system booting is completed, the first peripheral device 300-1 transmits content to the display apparatus 100, and the display apparatus 100 may output the content provided from the first peripheral device 300-1. Meanwhile, the display apparatus 100 transmits a turn-on signal for turning on the first peripheral device 300-1 determined to be turned off to the remote controller 200, and determines whether or not the content is received from the peripheral device 300-1 for the predetermined threshold time.

For example, a distance between the remote controller 200 and the first peripheral device 300-1 which is determined to be off may not exist in a preset range, or there may be an obstacle between the remote controller 200 and the first peripheral device 300-1. In this case, the first peripheral device 300-1 of which power is off may not receive an IR signal which is output from the remote controller 200.

When such an event happens, the display apparatus 100, after transmitting a turn-on signal to turn on the first peripheral device 300-1 to the remote controller 200, may determine that content is not received from the first peripheral device 300-1 within a predetermined threshold time.

As such, if it is determined that the content is not received from the first peripheral device 300-1 within the predetermined time, the display apparatus 100 displays a user interface (UI) for controlling the first peripheral device 300-1 on a screen of the display apparatus 100. Therefore, the user refers to the UI displayed on the screen of the display apparatus 100, and determines whether the IR signal output from the remote controller 200 is in a position suitable for the environment in which the first peripheral device 300-1 can receive the IR signal. By pressing an input button for turning on the power of the first peripheral device 300-1 provided in the remote controller 200 or pressing an input button for turning on the power provided in the first peripheral device 300-1, power of the first peripheral device 300-1 can be turned on.

On the other hand, the display apparatus 100, after the turn-on signal to turn on the first peripheral device 300-1 determined to be turned off is transmitted to the remote controller 200, may receive content from the first peripheral device 300-1 within predetermined threshold time. In this case, the display apparatus 100, after transmitting a turn-on signal to the remote controller 200, may update a predetermined threshold time with respect to the first peripheral device 300-1 as the time which is required from transmitting the turn-on signal to receiving the content from the first peripheral device 300-1.

On the other hand, after the display apparatus 100 transmits a turn-on signal for turning on the first peripheral device 300-1 determined to be turned off to the remote controller 200, the display apparatus may receive content from the first peripheral device 300-1 after the predetermined threshold time. For example, the time when the content is received from the first peripheral device 300-1 after the predetermined threshold time may be the time until when the UT for controlling an operation of the first peripheral device 300-1 is displayed on the screen of the display apparatus 100.

As such, if content is received from the first peripheral device 300-1 after predetermined threshold time, the display apparatus 100, after the turn-on signal to turn on the first peripheral device 300-1 determined to be turned off is transmitted to the remote controller 200, may receive content from the first peripheral device 300-1 within the predetermined threshold time. In this case, the display apparatus 100, after transmitting a turn-on signal to the remote controller 200, may update the predetermined threshold time with respect to the first peripheral device 300-1 as the time which is required from transmitting the turn-on signal to receiving the content from the first peripheral device 300-1.

As described above, if it is determined that power of the first peripheral device 300-1 is turned off, the display apparatus 100, ahead of transmitting a turn-on signal to turn on the first peripheral device 300-1, may determine whether the display apparatus 100 may control operation of the first peripheral device 300-1 which is connected to the display apparatus 100.

According to an exemplary embodiment, the display apparatus 100 may be connected to the first peripheral device 300-1 which is powered off through a High Definition Multimedia Interface Consumer Electronics Control (HDMI CEC). In particular, the display apparatus 100 determines that the operation of the first peripheral device 300-1 connected to the display apparatus 100 through the HDMI CEC protocol is controllable. Accordingly, the display apparatus 100 may transmit a control signal for turning on the first peripheral device 300-1 powered off to the HDMI CEC protocol. Accordingly, the first peripheral device 300-1 may perform a system boot by performing a turn-on operation according to a control signal received through the HDMI CEC protocol from the display apparatus 100.

Then, when system booting is completed, the first peripheral device 300-1 may transmit content to display apparatus 100, and the display apparatus 100 may output content provided from the first peripheral device 300-1.

In the meantime, the display apparatus 100, after transmitting a control signal to turn on to the first peripheral device 300-1 through HIM CEC protocol, may determine whether content is received from the first peripheral device 300-1 during the predetermined threshold time.

As a result of the determination, when the content is received from the first peripheral device 300-1 within the predetermined threshold time, the display apparatus 100 outputs the image and audio of the content received from the first peripheral device 300-1. At this time, the display apparatus 100 may update the predetermined threshold time which is required after the display apparatus 100 transmits a control signal to turn on the first peripheral device 300-1 until the content is received from the first peripheral device 300-1.

On the other hand, as described above, the predetermined threshold time may correspond to the time which is required after the control signal is transmitted from the display apparatus 100 to the remote controller 200 to turn on the first peripheral device 300-1, for determining whether or not the content is received from the device 300-1. However, the present exemplary embodiment is not limited thereto, and the threshold time for determining whether or not content is received from the first peripheral device 300-1 turned on by the display apparatus 100 may be different from the threshold time for determining whether or not the content has been received from the first peripheral device 300-1 turned on.

In the meantime, after transmitting the control signal to turn on the first peripheral device 300-1 through HDMI CEC protocol, if content is not received from the first peripheral device 300-1 within the predetermined threshold time, the display apparatus 100, as shown above, transmits a turn-on signal to turn on the first peripheral device 300-1 which is powered off to the remote controller 300.

The remote controller 200 converts the turn-on signal received from the display apparatus 100 to an IR signal and transmits the IR signal to the first peripheral device 300-1. The first peripheral device 300-1 may perform the process of system booting by performing a turn-on operation according to the IR signal received from the remote controller 200, and when the system booting is completed, transmits content to the display apparatus 100.

In the meantime, the display apparatus 100, after transmitting the turn-on signal to turn on the first peripheral device 300-1 to the remote controller 200, determines whether content is received from the first peripheral device 300-1 during the predetermined threshold time.

As a result of the determination, when the content is received from the first peripheral device 300-1 within the predetermined threshold time, the display apparatus 100 outputs the image and audio of the content received from the first peripheral device 300-1. At this time, the display apparatus 100 may update the predetermined threshold time which is required after the display apparatus 100 transmits a control signal to turn on the first peripheral device 300-1 until the content is received from the first peripheral device 300-1.

In the meantime, if it is determined that the content is not received from the first peripheral device 300-1 within the predetermined time, the display apparatus 100 displays the UI for controlling the first peripheral device 300-1 on the screen. Therefore, the user refers to the UI displayed on the screen of the display apparatus 100, and determines whether the IR signal output from the remote controller 200 is in a position suitable for the environment in which the first peripheral device 300-1 can receive the IR signal. By pressing an input button for turning on the power of the first peripheral device 300-1 provided in the remote controller 200 or pressing an input button for turning on the power provided in the first peripheral device 300-1, power of the first peripheral device 300-1 can be turned on.

In the meantime, as described above, if the display apparatus 100 controls the first peripheral device 300-1 through the HDMI CEC protocol, the display apparatus 100 may control the first peripheral device 300-1 by a control method which corresponds to a predetermined priority.

For example, when the display apparatus 100 is set to control the first peripheral device 300-1 through the HDMI CEC protocol, the display apparatus 100 transmits a control signal to turn on the first peripheral device 300-1 through the HDMI CEC protocol, and when content is not received from the first peripheral device 300-1 within a predetermined threshold time, the display apparatus 100 may transmit the control signal to the first peripheral device 300-1 through the remote controller 200-1 so that the power of the first peripheral device 300-1 is turned on.

For another example, when the first peripheral device 300-1 is first controlled through the remote controller 200, the display apparatus 100 transmits a control signal to turn on the power of the first peripheral device 300-1 to the remote controller 200. The display apparatus 100 may control not to perform the operation of a HDMI communication module for controlling the operation of the first peripheral device 300-1 through the HDMI CEC protocol.

According to the exemplary embodiments, the display apparatus 100 may overcome a problem that the first peripheral device 300-1 repeatedly performs a turn-on operation.

Hereinbelow, each configuration constituting the display apparatus 100 will be described in further detail.

Figure 2:
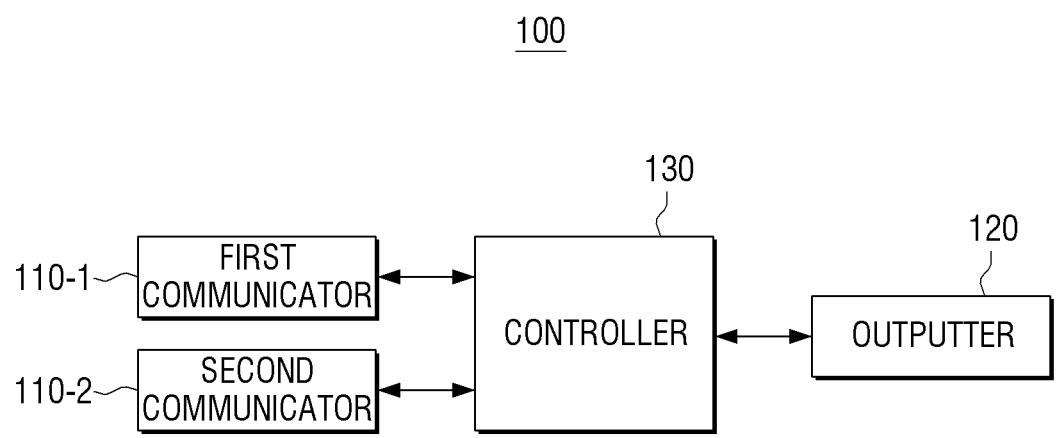
FIG. 2 illustrates a schematic block diagram of a display apparatus according to an exemplary embodiment.
Figure 3:
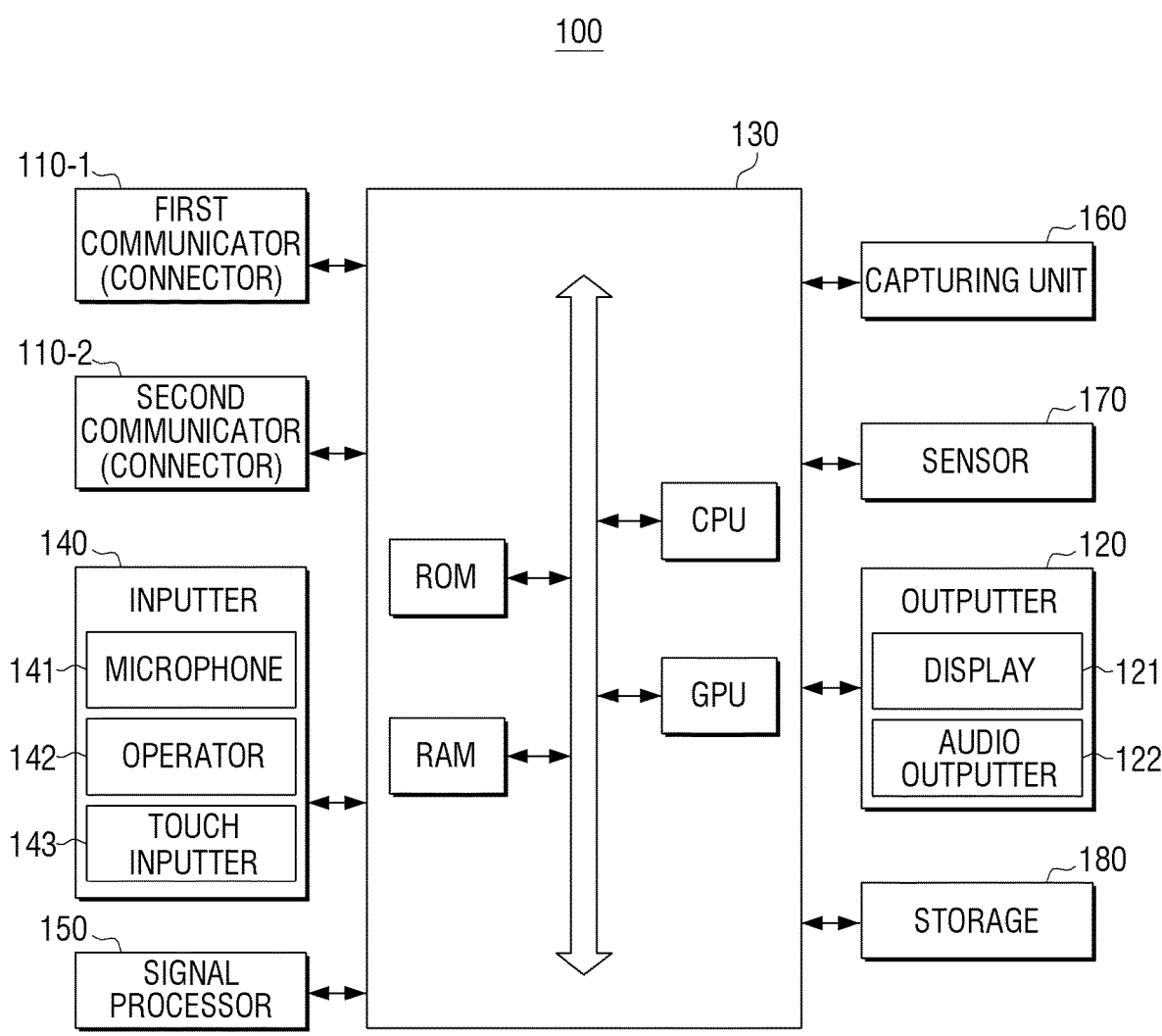
FIG. 3 illustrates a detailed block diagram of a display apparatus according to an exemplary embodiment.

FIG. 2 illustrates a schematic block diagram of a display apparatus according to an exemplary embodiment, and FIG. 3 illustrates a detailed block diagram of a display apparatus according to an exemplary embodiment. As shown in FIG. 2, the display apparatus 100 includes a first communicator (e.g., a first communication interface) 110-1 and a second communicator (e.g., a second communication interface) 110-2, an outputter (e.g., an output interface) 120, and a controller (e.g., a processor) 130.

The first communicator 110-1 communicates with one or more peripheral devices 300-1 and 300-2 that provides content, and the second communicator 110-2 communicates with the remote controller 200 which controls the operation of the display apparatus 100. The one or more peripheral devices 300-1 and 300-2 may include, for example, a set top box, a content reproducing device, a home theater, and the remote controller 200 may be an integrated remote controller for controlling one or more peripheral devices 300-1 and 300-2 connected by wire or wireless communication.

The first communicator 110-1 may be a connector or a connection port (e.g., a HDMI port), and the second communicator 110-2 may be a wireless communicator.

As shown in FIG. 3, the first communicator 110—receives content from the one or more peripheral devices 300-1 and 300-2 connected to a wired cable. Here, the peripheral device 300-1 is a set-top box that receives content transmitted from a content server and outputs the content to the display apparatus 100, or a content reproducing device which reads and stores content recorded in a storage medium such as a built-in memory or DVD and outputs data to the display apparatus 100.

The second communicator 110-2 performs wireless communication with the remote controller 200 which controls the display apparatus 100 and the one or more peripheral devices 300-1 and 300-2, receives a predetermined signal from the remote controller 200 or transmits a turn-on signal to control the one or more peripheral devices 300-1 and 300-2 to the remote controller 200.

The second communicator 110-2 may include at least one of Bluetooth module which is near field communication module, infrared data association (IrDA) module, near field communication (NFC), Wi-Fi (WIFI), and Zigbee, and communicate with the remote controller 200 through the near field communication.

However, the present exemplary embodiment is not limited thereto, and the second communicator 110-2 is connected to an external network according to wireless protocol such as IEEE or may further include mobile communication module which access mobile communication network for communication according to various mobile communication standards such as 3rd generation (3G), 3rd generation partnership project (3GPP), and long term evolution (LTE).

The outputter 120 outputs content which is output from the peripheral device 300-1. In particular, the content may include at least one of audio and video data. Accordingly, the outputter 120 may output the content including the audio and video data subjected to signal processing in an outputtable form. To this end, the outputter 120 may include a display 121 and an audio output unit 122, as shown in FIG. 3.

The display 121 displays an image of the content which is output from the peripheral device 300-1, and the audio outputter 122 outputs audio of the corresponding content through the speaker as audible sound.

The display 121 which displays an image of content may be implemented as liquid crystal display (LCD), organic light emitting display (OLED) or plasma display panel (PDP), etc. In particular, the display 131 may be implemented as a touch screen which builds a mutual layer along with the touch inputter 133 included in the inputter 140 to be described later.

The controller 130 controls the operation of each of the components constituting the display apparatus 100 as a whole.

In particular, the controller 130 may determine that a turn-on signal is received from the remote controller 200.

The turn-on signal may include a command for booting an operating system of the peripheral device 300-1. The controller 130 may control a communication interface (e.g., the first communicator 110-1 and/or the second communicator 110-2) to transmit the turn-on signal to the peripheral device 300-1, and may store, in a storage 180, a first time when the turn-on signal is transmitted to the peripheral device 300-1. Upon receipt of a response signal that corresponds to the turn-on signal from the peripheral device 300-1, the controller 130 may measure a time interval between the first time and a second time when the response signal is received from the peripheral device 300-1, and may determine whether the operating system of the peripheral device 300-1 is being booted based on a comparison between the stored threshold time and the measured time interval. The controller 130 may stop transmitting a subsequent turn-on signal to the peripheral device 300-1 in response to determining that the operating system of the peripheral device 300-1 is being booted. The response signal may include a content to be displayed on the display apparatus and an acknowledgement indicating that the peripheral device has recited the turn-on signal.

According to an exemplary embodiment, when the initial communication with the peripheral device 300-1 is started to the first communicator 110-2, the controller 130 determines a threshold time to determine whether content is received from the peripheral device 300-1 according to an exemplary embodiment. Here, the threshold time of the peripheral device 300-1 may be the time from when the peripheral device 300-1 is turned on to boot the system, and until the time the content is transmitted to the display apparatus 100.

According to an exemplary embodiment, the controller 130 measures a time interval between a first time when a turn-on signal is transmitted to the remote controller 200 to turn on the peripheral device 300-1 and a second time when content is received from the peripheral device 300-1 through the first communicator 110-1. Then, the controller 130 may set the measured time as threshold time to determine whether content is received from the peripheral device 300-1.

However, the present exemplary embodiment is not limited thereto, and when the initial communication with the peripheral device 300-1 is started through the first communicator 110-1, the controller 130 receives identification information of the peripheral device 300-1, and transmits the identified identification information to an external server. Here, the external server may be a server that stores device information corresponding to each of the peripheral devices 300-1 and 300-2. The device information may include at least one of identification information of the peripheral devices 300-1 and 300-2, boot-related threshold time information, and control inform.

Therefore, the external server, when identified information of the peripheral device 300-1 which is connected to the display apparatus 100 is received from the display apparatus 100, may transmit at least one of the threshold time and control information of the peripheral device 300-1 with reference to the received identification information.

Thus, the controller 130 may store a threshold time and control information received from the external server to a storage 180.

Through the exemplary embodiment, when the threshold time with respect to the peripheral device 300-1 connected to the display apparatus 100 is set, the controller 130 may determine whether content is received from the peripheral device 300-1 based on the predetermined threshold time of the peripheral device 300-1.

When it is determined that the peripheral device 300-1 is turned off, the controller 130 performs a control operation to turn on the peripheral device 300-1.

First of all, the controller 130, after threshold time of the peripheral device 300-1 is set and the predetermined signal is received from the remote controller 200 through the second communicator 110-2, performs a control operation corresponding to the received signal.

Here, the preset signal may be a signal to turn on the power of the display apparatus 100 or a signal to change a source device which provides content to be output from the display apparatus 100.

For example, when the display apparatus 100 is powered off, the remote controller 200 may transmit a turn-on control signal to turn on the power of the display apparatus 100 to the display apparatus 100 according to a user command. When this control signal is received, the controller 130 may perform a turn-on operation according to the control signal received from the remote controller 200 and perform the system booting.

As another example, as illustrated in FIG. 1, the display apparatus 100 may be communicatively connected to the first and second peripheral devices 300-1 and 300-2. Here, the first peripheral device 300-1 may be a set-top box receiving content provided by a content server and outputting the received content to the display apparatus 100, and the second peripheral device 300-2 may be a content reproduction device for providing content recorded on a storage medium such as a DVD. The display apparatus 100 connected to the first and second peripheral devices 300-1 and 300-2 may output the content provided from the first peripheral device 300-1.

While the content provided from the first peripheral device 300-1 is being output, the remote controller 200 may transmit, to the display apparatus 100, the content for switching the content source from the first peripheral device 300-1 to the second peripheral device 300-2. When the control signal is received, the controller 130 may control the first communicator 110-1 to stop outputting the content of the first peripheral device 300-1 according to the control signal received from the remote controller 200 and switch source to the second peripheral device 300-2 to output the content provided from the second peripheral device 300-2.

As such, after the threshold time of the first peripheral device 300-1 to receive content is set and the predetermined signal is received from the remote controller 200, the controller 130, after performing a control operation corresponding to a signal received from the remote controller 200 and then determine a power state of the first peripheral device 300-1 to receive content.

According to an exemplary embodiment, the controller 130, after the threshold time of the first peripheral device 300-1 to receive content is set and the predetermined signal is received from the remote controller 200, may determine a power state of the first peripheral device 300-1 through whether content is received from the first peripheral device 300-1.

According to another exemplary embodiment, the controller 130, after the threshold time with respect to the first peripheral device 300-1 is set, when the predetermined signal is received from the remote controller 200, determines whether a voltage value with respect to power supplied to the first peripheral device 300-1 is less than a threshold voltage value, and determine a power state of the first peripheral device 300-1.

In the exemplary embodiment, if it is determined that the first peripheral device 300-1 is powered off, the controller 130 performs a control operation to turn on the power of the first peripheral device 300-1 which is determined to be off.

If it is determined that the first peripheral device 300-1 is turned off through the above exemplary embodiment, the controller 130 may turn an power of the first peripheral device 300-1 according to the following exemplary embodiment, and determine whether content is received within the predetermined threshold time from the first peripheral device 300-1.

According to an exemplary embodiment, the controller 130, if it is determined that the first peripheral device 300-1 is powered off, transmits a turn-on signal to turn on power of the first peripheral device 300-1, to the remote controller 200.

Specifically, when it is determined that the power of the first peripheral device 300-1 to be provided with content is turned off, the controller 130 controls the storage 180 based on identification information of the first peripheral device 300-1, and acquires control information of the first peripheral device 300-1 that is powered off, among the control information for each of the first and second peripheral devices 300-1 and 300-2. Thereafter the controller 130 converts a control command for turning on the power among the control commands for controlling the operation of the first peripheral device 300-1 included in the acquired control information to a value that can be output from the remote controller 200. That is, the controller 130 converts a control command for turning on the power to a value that can be output as an IR signal in the remote controller 200.

Then, the controller 130 transmits a turn-on signal which is converted to a value outputtable as an IR signal to the remote controller 200 through the communicator 110.

Accordingly, the remote controller 200 converts the turn-on signal received from the display apparatus 100 to an IR signal, and transmits the turn-on signal converted to the IR signal to the first peripheral device 300-1. Accordingly, the first peripheral device 300-1 may perform the turn-on operation according to the IR signal received from the remote controller 200 and perform the system booting.

In the meantime, along with the control information of the first peripheral device 300-1 which is turned off, in order to determine whether content is received from the first peripheral device 300-1, predetermined threshold time information may be stored in the storage 180.

Therefore, the controller 130, when control information of the first peripheral device 300-1 is acquired, may acquire the predetermined threshold time information with respect to the first peripheral device 300-1.

Accordingly, the controller 130, after transmitting a turn-on signal to turn on the power of the first peripheral device 300-1 to the remote controller 200, determines whether the content is received from the first peripheral device 300-1 within the predetermined threshold time with respect to the first peripheral device 300-1.

When content is not received from the first peripheral device 300-1 within the predetermined threshold time, the controller 130 controls the display 121 to display a UI for controlling the first peripheral device 300-1 which is determined to be turned off. Accordingly, the display 121 displays a UI for controlling the first peripheral device 300-1, which is determined to be turned off, on a screen.

Therefore, the user can refer to the UI displayed on the screen of the display apparatus 100 to determine whether the signal output from the remote control apparatus 200 is appropriate for the environment in which the first peripheral device 300-1 can receive the IR signal. The user presses an input button to turn on the first peripheral device 300-1 provided on the remote controller 200 or an input button to turn on the power of the first peripheral device 300-1.

In the meantime, the controller 130, after transmitting a turn-on signal to turn on the first peripheral device 300-1 which is determined to be turned off to the remote controller, may receive content from the first peripheral device 300-1 during the predetermined threshold time.

In this case, the controller 130 may update the threshold time with respect to the first peripheral device 300-1 as the time which is required from transmitting the turn-on signal to turn on the first peripheral device 300-1 to the remote controller 200 to receiving the content from the first peripheral device 300-1 and store the time in the storage 180.

However, the present exemplary embodiment is not limited thereto. When the content is received from the first peripheral device 300-1 after a predetermined threshold time, the controller 130 transmits a turn-on signal for turning on the first peripheral device 300-1 to the remote controller 200, and update the time taken until the content is received from the first peripheral device 300-1 turned on by the IR signal of the remote controller 200 after the turn-on signal to turn on the first peripheral device 300-1 is received.

For example, in case of the time taken after the predetermined threshold time to receiving the content from the first peripheral device 300-1, if it is determined that content is not received from the first peripheral device 300-1 within the predetermined threshold time, it can be time until the UI for controlling an operation of the first peripheral device 300-1 is displayed on a screen.

When the content is received from the first peripheral device 300-1 after the predetermined threshold time, the controller 130 may update time taken after transmitting a turn-on signal for turning on the first peripheral device 300-1 to the remote controller 200 until receiving content from the first peripheral device 300-1 turned on by the IR signal of the remote controller 200 as the predetermined threshold time. As such, when threshold time of the first peripheral device 300-1 is updated, the controller 130 may determine a power state of the controller 130 with respect to the updated threshold time.

According to another exemplary embodiment, the first peripheral device 300-1 to receive content may be controlled through High Definition Multimedia Interface Consumer Electronics Control (HDMI CEC), and it may be determined that the power state of the first peripheral device 300-1 is turned off.

In this case, the controller 130 may control the first communicator 1101 to transmit a turn-on signal to the first peripheral device 300-1 through the HDMI CEC so that the first peripheral device 300-1 is turned on according to the turn-on signal. Then, the controller 130 determines whether content is received from the first peripheral device 300-1 through the first communicator 110-1 during the predetermined threshold time.

As a result of the determination, when the content is received from the first peripheral device 300-1 for a predetermined threshold time, the controller 130 updates the predetermined threshold time as time from the turn-on signal is transmitted to the first peripheral device 300-1 to the content is received from the corresponding peripheral device 300-1 through the first communicator 110-1 and store the time in the storage 180.

In the meantime, if the content is not received from the first peripheral device 300-1 which transmits the turn-on signal during the predetermined threshold time, the controller 130 transmits the turn-on signal to turn on the corresponding peripheral device 300-1 to the remote controller 200.

As described above, the controller 130, based on the identification information of the first peripheral device 300-1 which is determined to be turned off, acquires control information of the turned-off first peripheral device 300-1 from among the control information by a plurality of the first peripheral device 300-1 prestored in the storage 180. Then, the controller 130 converts a control command to turn on the power to a value outputtable from the remote controller 200 from among the control commands for controlling operation of the first peripheral device 300-1 included in the acquired control information.

Then, the controller 130 transmits a turn-on signal which is converted to a value outputtable as an IR signal to the remote controller 200 through the second communicator 110-2.

Accordingly, the remote controller 200 converts the turn-on signal received from the display apparatus 100 to an IR signal, and transmits the IR signal to the first peripheral device 300-1. Accordingly, the first peripheral device 300-1 may perform the turn-on operation according to the IR signal received from the remote controller 200 and boot the system of the first peripheral device 300-1. The first peripheral device 300-1 completed with system booting transmits content to the display apparatus 100 communicatively connected to the first peripheral device 300-1.

Accordingly, the controller 130 determines whether content is received during the predetermined threshold time with respect to the first peripheral device 300-1 from the system booted first peripheral device 300-1 according to a control command of the remote controller 200.

That is, the controller 130, after transmitting a turn-on signal to turn on the power of the first peripheral device 300-1 to provide content to the remote controller 200, determines whether content is received from the first peripheral device 300-1 within the predetermined threshold time through the first communicator 110-1.

If it is determined that the content is not received from the first peripheral device 300-1 within a predetermined threshold time, the controller 130 controls the display 121 to display a UI for controlling the first peripheral device 300-1.

Accordingly, the user can refer to the UI displayed on the screen of the display apparatus 100 to determine whether the IR signal output from the remote control apparatus 200 is appropriate for the environment in which the first peripheral device 300-1 can receive the IR signal. The user presses an input button to turn an the first peripheral device 300-1 provided on the remote controller 200 or an input button to turn on the power of the first peripheral device 300-1.

Meanwhile, when the power of the first peripheral device 300-1 is determined to be turned off, the predetermined threshold time may be a reference time to determine whether content is received from the first peripheral device 300-1 after transmitting a turn-on signal to turn on the first peripheral device 300-1 to the remote controller 200 or whether content is received from the first peripheral device 300-1 after transmitting a control signal to turn on the power of the first peripheral device 300-1 which is turned off.

In addition, the predetermined threshold time may be time to determine a power state of the first peripheral device 300-1 for providing content.

In the meantime, the controller 130, after transmitting a turn-on signal on the first peripheral device 300-1 which is determined to be turned off to the remote controller 200, may receive content from the first peripheral device 300-1 during the predetermined threshold time.

In this case, the controller 130 may update the threshold time with respect to the first peripheral device 300-1 based on a time interval between a first time when the turn-on signal is transmitted to the remote controller 200 to turn on the first peripheral device 300-1 and a second time when the content is received from the peripheral device 300. The controller 130 may measure the time interval and change the threshold time to the measured time interval.

However, the present exemplary embodiment is not limited thereto. When the content is received from the first peripheral device 300-1 after a predetermined threshold time, the controller 130 transmits a turn-on signal for turning on the first peripheral device 300-1 to the remote controller 200, and update the time taken until the content is received from the first peripheral device 300-1 turned on by the IR signal of the remote controller 200 after the turn-on signal to turn on the first peripheral device 300-1 is received.

As such, when the threshold time is updated, the controller 130 may determine the power state of the first peripheral device 300-1 based on the updated threshold time, or determine whether content is received from the display apparatus 100 or the first peripheral device 300-1 which is controlled by the remote controller 200.

In the meantime, as described above, if the first peripheral device 300-1 can be controlled through a plurality of communication protocols including the HDMI CEC protocol, the controller 130 may control the first peripheral device 300-1 by a control method which corresponds to a predetermined priority.

For example, when the first peripheral device 300-1 is set to be preferably controlled through the HDMI CEC protocol, the controller 130 may transmit a control signal for turning on the power of the first peripheral device 300-1 through the HIM CEC protocol, and if the content is not received from the first peripheral device 300-1 within the predetermined threshold time, may transmit a control signal for turning on the power of the first peripheral device 300-1 to the remote controller 200.

Accordingly, the display apparatus 100 may transmit the control signal to turn on the power of the first peripheral device 300-1 based on HDMI CEC protocol and the remote controller 200 in a duplicate manner, thereby overcoming a problem that the first peripheral device 300-1 repeatedly performs a turn-on operation.

Hereinbelow, the configuration of the display apparatus 100 will be described in further detail.

As described in FIG. 3, the display apparatus 100 may further include an inputter (e.g., an input interface) 140, a signal processor 150, a capturing unit (e.g., a camera) 160, a sensor 170, and a storage 180 in addition to the aforementioned first and second communicators 110-1, 110-2, the outputter 120, and the controller 130.

The inputter 140 receives various user commands and transfers the commands to the controller 130. The inputter 140 includes a microphone 141, an operator 142, and a touch inputter 143.

The microphone 141 receives a user command through a speech voice of the user. The operator 142 may be implemented as a keypad having various function keys, numeric keys, special keys, character keys, and the like. The touch inputter 143 may be configured as, when the display 121 described above is formed as a touch screen, a touch pad having a mutual layer structure with the display 121 when implemented. In this case, the touch inputter 143 can receive a touch command for the icon displayed through the display 121. The signal processor 150 may receive the content received from the one or more peripheral devices 300-1 and 300-2 connected to the display apparatus 100 in a wired or wireless manner or the image data of the content stored in the storage 180 according to a control command of the controller 130. Specifically, the signal processor 150 may perform various image processes such as decoding, scaling, noise filtering, frame rate conversion, and resolution conversion on the image data included in the received content. In addition, the signal processor 170 may perform various audio signal processing such as decoding, amplification, noise filtering, and the like on the audio data included in the content.

Therefore, the display 121 displays an image of the content which is signal-processed by the signal processor 150, and the audio outputter 122 outputs audio of the corresponding content through the speaker as audible sound.

In the meantime, when the display apparatus 100 is implemented as an electronic device such as a smartphone, smart TV, and tablet PC, the capturing unit 160 and the sensor 170 may be included. The capturing unit 160 captures a still image or a video according to a user command.

The sensor 170 senses various operating states and user interactions of the display apparatus 100. In particular, the sensor 170 may sense a state of gripping the display apparatus 100 by a user. In particular, the display apparatus 100 may be rotated or tilted in various directions. At this time, the sensor 170 senses the inclination of the display apparatus 100 that the user grasps based on the rotational motion or gravity direction using at least one of various sensors such as a geomagnetism sensor, a gyro sensor, and an acceleration sensor. Accordingly, the controller 130 may perform an operation corresponding to the sensing result sensed by the sensor 170.

As described above, the storage 180 may store control information to control at least one the display apparatus 100 and the first peripheral device 100-1 which is communicatively connected through the first communicator 110-1 and threshold time information to determine whether content is received from the first peripheral device 300-1.

As described above, when the controller 130 is initially connected to the first peripheral device 300-1 through the first communicator 110-1, the controller 130 acquires identification information of the first peripheral device 300-1 communicatively connected, receives control information for the first peripheral device 300-1 from an external server and the threshold time information for determining whether the first peripheral device 300-1 receives the content and receives the information to storage 180.

However, the present exemplary embodiment is not limited thereto. As described above, when the controller 130 is initially connected to the first peripheral device 300-1 through the first communicator 110-1, the controller transmits a turn-on signal to the first peripheral device 300-1 or the remote controller 200. Thereafter, the controller 130 measures the time from the time of transmitting the turn-on signal for turning on the power of the first peripheral device 300-1 to the time of receiving the content from the system booted first peripheral device 300-1. Then, the controller 130 sets the measured time as a threshold time for determining whether or not the first peripheral device 300-1 receives the content. When the threshold time of the first peripheral device 300-1 is set, the controller 130 may match the predetermined threshold time, identification of the first peripheral device 300-1 and control information received from the external server and store in the storage 180. In the meantime, the storage 180 may match and store the identification information, control information, and threshold time information by the plurality of first peripheral device 300-1 communicatively connected to the first communicator 110-1 of the display apparatus 100 and may further save an operating system program and an application program.

Here, when the display apparatus 100 is turned on, the operating system may be a program that is read in the storage 180 and compiled to operate each configuration of the display apparatus 100. The application program is read out from the storage 180 by the operating system by the execution command of the user, and is transferred to the executable form to perform various operations. In addition, the storage 180 may store various multimedia data processed by the controller 130, content data, and data received from an external source.

As such, the storage 180 may be implemented as at least one of ROM, RAM, memory card (e.g., SD card, memory stick) attachable/detachable to/from display device, non-volatile memory, volatile memory, hard disk drive (HDD) or solid state drive (SSD).

In the meantime, the aforementioned controller 130 may include a central processing unit (CPU), a read-only memory (ROM), a random access memory (RAM), and a graphic processing unit (GPU), and the CPU, ROM, RAM, and GPU may be interconnected through a bus.

The CPU, by accessing the storage 180, performs booting using the operating system program stored in the storage 180. In addition, the CPU performs various operations using various programs, contents, and data stored in the storage 180.

In the ROM, a command set for booting the system and the like is stored. When the turn-on command is input and power is supplied, the CPU copies the OS stored in the storage 180 to the RAM according to the command stored in the ROM, and executes the OS to boot the system. When the booting is completed, the CPU copies various programs stored in the storage 180 to the RAM, executes the program copied to the RAM, and performs various operations.

The GPU creates a display screen that includes various objects such as icons, images, text, and the like. Specifically, the GPU calculates an attribute value such as a coordinate value, a shape, a size, and a color according to the layout of the screen based on the received control command, and generates a display screen with various layouts including an object based on the calculated attribute value.

The controller 130 may be combined with the aforementioned various configurations and implemented as system-on-a-chip or System on chip (SoC).

Hereinafter, each configuration of the remote controller 200 will be described.

Figure 4:
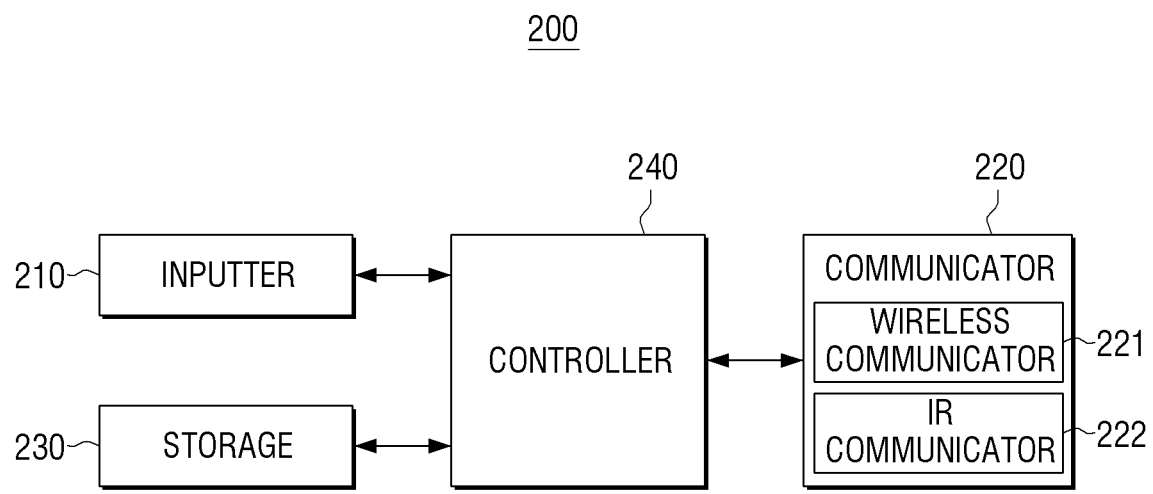
FIG. 4 illustrates a block diagram of a remote controller according to an exemplary embodiment.

FIG. 4 illustrates a block diagram of a remote controller according to an exemplary embodiment.

As illustrated in FIG. 4, the remote controller 200 may be an integrated remote controller to control one or more peripheral devices 300-1 and 300-2 which is connected to the display apparatus 100 and provides contents. The remote controller 200 includes an inputter 210, a communicator 220, a storage 230, and a controller 240.

The inputter 210 is connected to the display apparatus 100 receives a user command for controlling the operation of the one or more peripheral devices 300-1 and 300-2. Specifically, the inputter 210 may receive a user command for controlling the display apparatus 100 and one or more peripheral devices 300-1 and 300-2 which are connected to the display apparatus 100 in a wired or wireless manner through input means such as a microphone or an operation unit.

The communicator 220 transmits a user command which is input through the inputter 210 to the display apparatus 100 and one or more peripheral devices 300-1 and 300-2 which is connected to the display apparatus 100 and provides contents.

The communicator 220 includes a wireless communicator 221 and an IR transmitter 222. The wireless communicator 221 transmits a user command to control the operations of the display apparatus 100 which is input through the inputter 210 to the display apparatus 100.

According to an exemplary embodiment, the wireless communicator 221 may transmit a user command to control the operations of the display apparatus 100 to the display apparatus 100 through local wireless communication module such as Bluetooth module Near Field Communication (NFC) module, WIFI module, and Zigbee module.

The IR transmitter 222 transmits a turn-on signal for controlling the operation of the one or more peripheral devices 300-1 and 300-2 connected to the display apparatus 100 in a wired or wireless manner as an IR signal. Here, the control command may be received from the display apparatus 100 through the wireless communicator 221 or may be prestored in the storage 230.

The storage 230 stores a control command to control operations of the display apparatus 100. In addition, the storage 230 may store a control command of the one or more peripheral devices 300-1 and 300-2 which is received from the display apparatus 100. Here, the one or more peripheral devices 300-1 and 300-2 may be a source device which is communicatively connected to the display apparatus 100 and provides contents to the display apparatus 100.

The controller 240 controls the operation of each configuration of the remote controller 200 as a whole. In particular, when a user command for controlling the operation of the display apparatus 100 is inputted through the inputter 210, the controller 240 acquires a control command corresponding to the inputted user command from the storage 230, and converts the acquired control command to a control signal. Thereafter, the controller 240 controls the wireless communicator 221 to transmit the control command converted from the control signal from the display apparatus 100.

Accordingly, the wireless communicator 220 may transmit the control command converted to a control signal to the display apparatus 100 and the display apparatus 100 may perform a control operation corresponding to the control signal received from the remote controller 200.

Meanwhile, when a user command is input to the one or more peripheral devices 300-1 and 300-2 that communicate with the display apparatus 100 through the inputter 210 and provides content, the controller 240 acquires a control command corresponding to the input user command from the storage 230, and converts the acquired control command into an IR signal. Then, the controller 240 controls the IR transmitter 222 to transmit the control command converted into the IR signal to the one or more peripheral devices 300-1 and 300-2. Accordingly, the IR transmitter 222 transmits the control command converted into the IR signal to the one or more peripheral devices 300-1 and 300-2 of which control is requested by the user. The one or more peripheral devices 300-1 and 300-2 may perform a control operation responding to the IR signal received from the remote controller 200.

In the meantime, the controller 240, when a control signal to control operations of the one or more peripheral devices 300-1 and 300-2 is received from the display apparatus 100 through the wireless communicator 221, convers the received control signal to an IR signal.

When it is determined that the peripheral device 300-1 which communicates with the display apparatus 100 and provides the content is turned off, the display apparatus 100 transmits a turn-on signal to turn on the power-off peripheral device 300-1. When such turn-on signal is received, the controller 240 converts the received turn-on signal into an IR signal, and transmits the turn-on signal converted into the IR signal through the IR transmitter 222 to the peripheral device 300-1. Accordingly, the peripheral device 300-1 performs the turn-on operation according to the IR signal received from the remote controller 200 to perform the system be can transmit the content to the display apparatus 100 when the system booting is completed.

Hereinbelow, an operation to control, by the display apparatus 100, operations of the peripheral device 300-1 providing content will be described in greater detail.

Figure 5A:
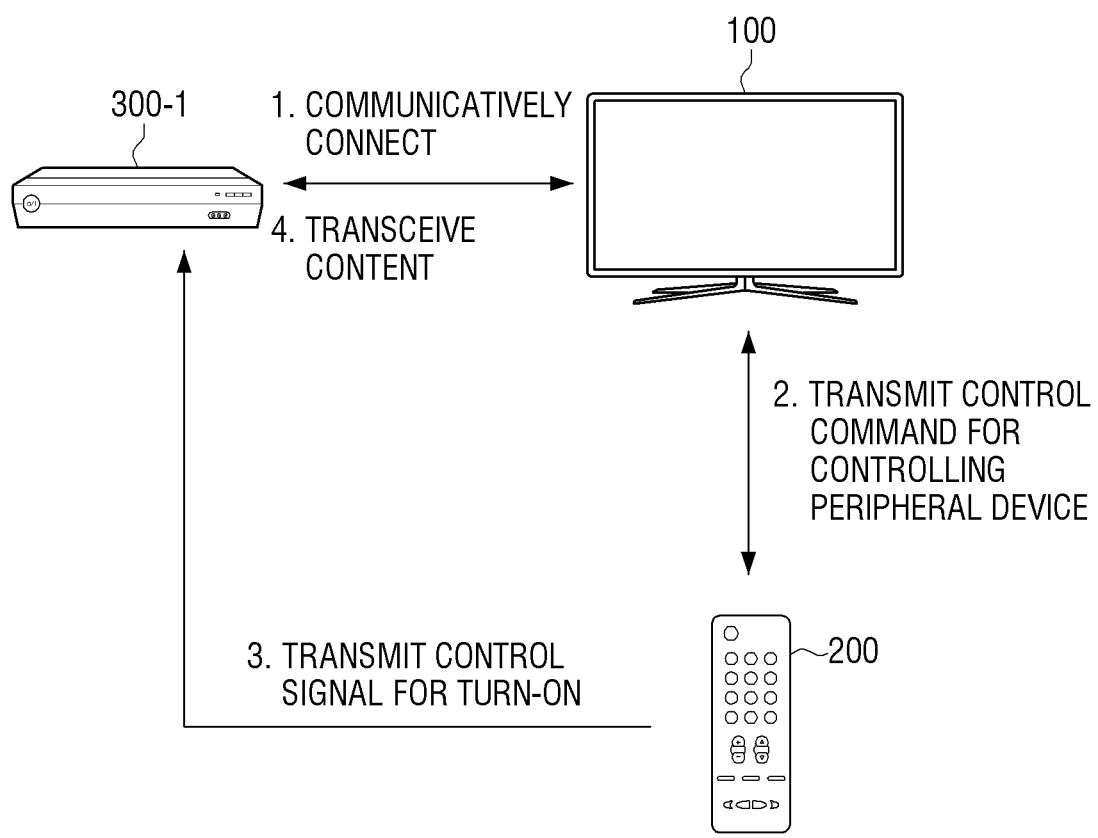
FIG. 5A shows setting a threshold time of a peripheral device that provides content to a display apparatus according to an exemplary embodiment.

FIG. 5A illustrates setting a threshold time of a peripheral device that provides content to a display apparatus according to an exemplary embodiment.

As described in FIG. 5A, the display apparatus 100, when initially connected to the first peripheral device 300-1, receives identification information of the first peripheral device 300-1 from the first peripheral device 300-1 and control information for controlling operations of the first peripheral device 300-1.

However, the present exemplary embodiment is not limited thereto, and when the display apparatus 100 receives the identification information of the first peripheral device 300-1 from the first peripheral device 300-1 which is initially connected, the display apparatus 100 transmits information requesting device including the received identification information to an external server. Accordingly, an external server that stores the device information corresponding to each of the plurality of peripheral devices 300-1 and 300-2 transmits control information of the first peripheral device 300-1 which is connected to the display apparatus 100 to the display apparatus 100 based on identification information included in the information requested by the device received from the display apparatus 100.

When such control information of the first peripheral device 300-1 is received, the display apparatus 100 matches the identification information and the control information of the first peripheral device 300-1 and stores the identification information in association with the control information.

After that, the display apparatus 100 performs a turn-on operation according to a control signal received from the remote controller 100 to boot the system of the display apparatus 100. When the system is booted, the display apparatus 100 acquires a control command for turning on the first peripheral device 300-1 from pre-stored control information of the first peripheral device 300-1, and converts the acquired control command into a value that can be output from the remote controller 200. Thereafter, the display apparatus 100 transmits a turn-on signal converted into a value that can be output from the remote control apparatus 200 to the remote control apparatus 200 in association with the control command.

Accordingly, the remote control apparatus 200 converts the turn-on signal received from the display apparatus 100 into an IR signal, and transmits the IR signal to the first peripheral device 300-1. Accordingly, the first peripheral device 300-1 turns on according to the IR signal received from the remote controller 200 to boot the system, and when the system booting is completed, transmits the content to the display apparatus 100.

In the meantime, the display apparatus 100 measures time from transmitting a turn-on signal to turn on the power of the first peripheral device 300-1 to the remote controller 200 to receiving content from the first peripheral device 300-1. Then, the display apparatus 100 sets the measured time as threshold time to determine whether content is received from the first peripheral device 300-1.

When the threshold time is set, the display apparatus 100 may match and store prestored identification information, control information, and predetermined threshold time with respect to the first peripheral device 300-1.

Figure 5B:
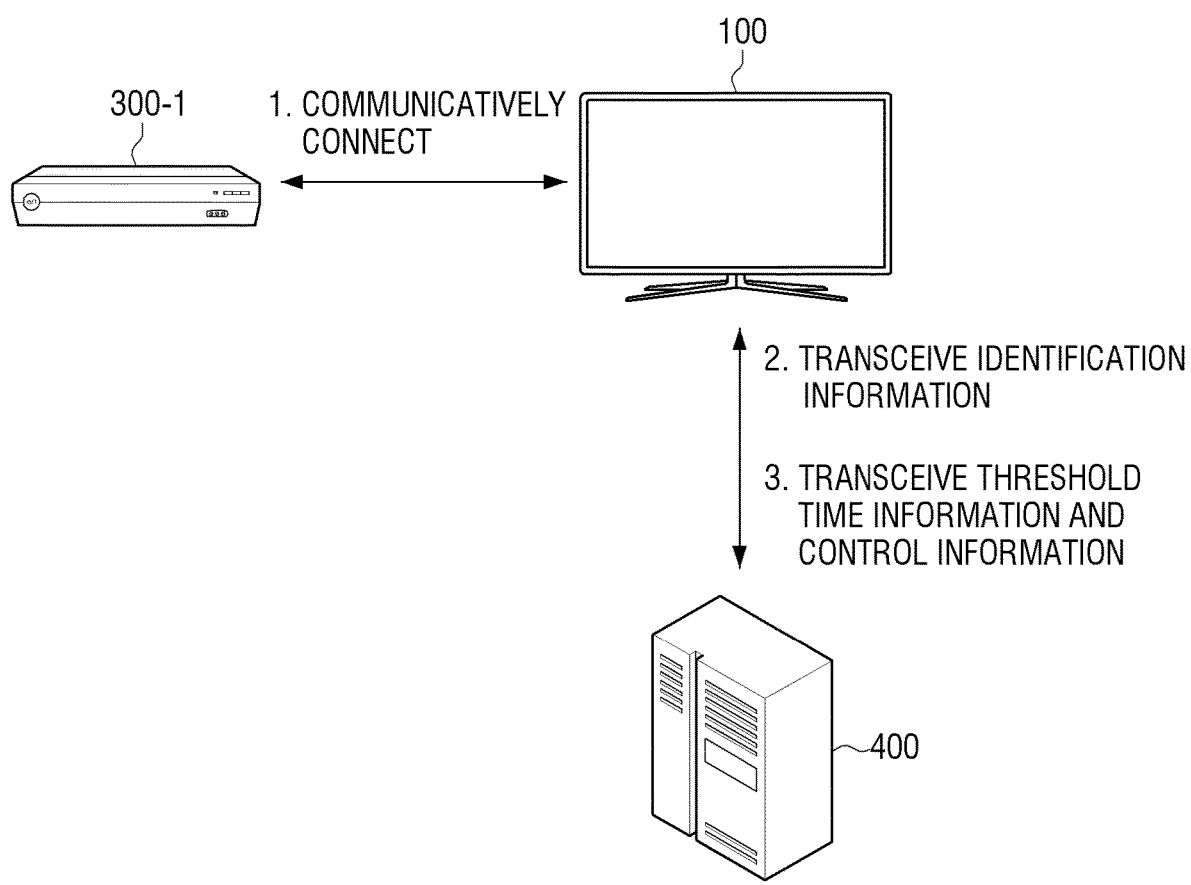
FIG. 5B shows setting a threshold time of a peripheral device that provides content to a display apparatus according to another exemplary embodiment.

FIG. 5B illustrates setting a threshold time of a peripheral device that provides content to a display apparatus according to another exemplary embodiment.

As illustrated in FIG. 5B, the display apparatus 100, when initially connected to the first peripheral device 300-1, receives identification information of the first peripheral device 300-1 from the first peripheral device 300-1.

When the identification information of the first peripheral device 300-1 is received, the display apparatus 100 transmits, to an external server 400, device request information including the identification information received from the first peripheral device 300-1. Accordingly, the external server 400, which stores device information corresponding to each of the plurality of peripheral devices 300, is connected to the display apparatus 100, and transmits control information of the peripheral device 300-1 and threshold time information set for determining whether the first peripheral device 300-1 receives the content to the display apparatus 100.

Accordingly, the display apparatus 100 may match and store the identification information of the first peripheral device 300-1 and the control information and the threshold time information of the first peripheral device 300-1 received from the external server 400.

Figure 6:
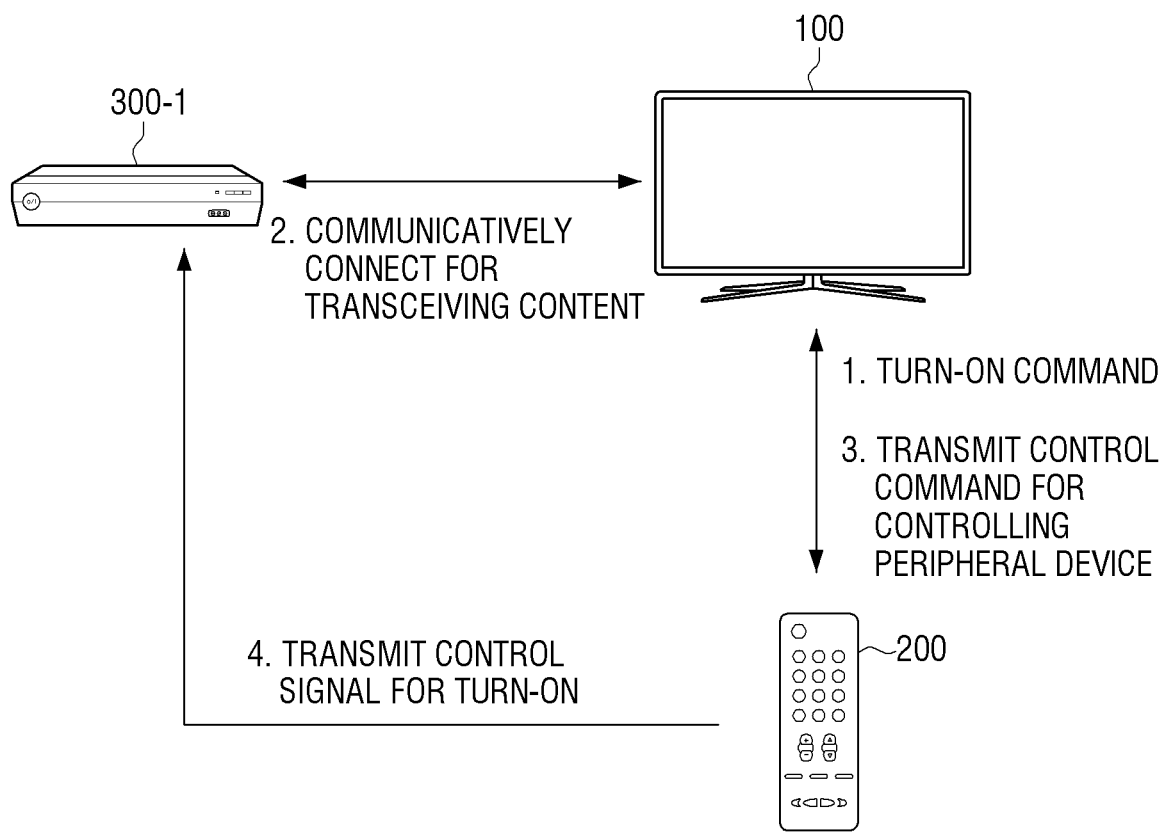
FIG. 6 illustrates controlling an operation of a peripheral device which provides content through a remote controller from a display apparatus according to an exemplary embodiment.

FIG. 6 illustrates controlling an operation of a peripheral device which provides content through a remote controller from a display apparatus according to an exemplary embodiment.

As illustrated in FIG. 6, when the power of the display apparatus 100 is off, the remote controller 200 transmits a turn-on related control signal to the display apparatus 100 through a local wireless communication module such as Bluetooth according to a user command.

Accordingly, the display apparatus 100 turns on according to the control signal received from the remote control apparatus 200 to perform system booting. When the system booting is completed, the display apparatus 100 determines a power state of the first peripheral device 300-1 by performing a communication connection for transmitting/receiving contents to/from the first peripheral device 300-1. Here, the first peripheral device 300-1 may be a set-top box that receives content provided from a content server and outputs the received content to the display apparatus 100.

Specifically, when the system booting is completed by turning on according to the control signal received from the remote controller 200, the display apparatus 100 checks whether the content is received within a predetermined threshold time from the first peripheral device 300-1 to determine the power state of the first peripheral device 300-1.

When content is not received within the predetermined threshold time, the display apparatus 100 determines that the first peripheral device 300-1 is powered off.

However, the present exemplary embodiment is not limited thereto, and the display apparatus 100 compares the voltage value of the power supplied to the first peripheral device 300-1 with a predetermined threshold voltage value when the system booting is completed. As a result of the comparison, if the predetermined threshold voltage value is less than the predetermined threshold voltage value, the display apparatus 100 determines that the first peripheral device 300-1 is powered off.

As such, if it is determined that the first peripheral device 300-1 is powered off, the display apparatus 100 transmits a control command for turning on the power of the first peripheral device 300-1 to the remote controller 200 to convert to a value that can be output as an IR signal. Thereafter, the display apparatus 100 transmits the turn-on signal converted into a value that can be output from the remote controller in association with the control command.

The remote controller, when a turn-on signal to turn on the power of the first peripheral device 300-1 is received from the display apparatus 100, converts the received turn-on signal to an IR signal and transmits the converted IR signal to the first peripheral device 300-1.

Accordingly, the first peripheral device 300-1 performs a turn-on operation in accordance with the IR signal received from the remote controller 200, and when the system is booted according to the turn-on operation, the first peripheral device 300-1 transmits the content to the display apparatus 100 connected to the first peripheral device 300-1 in a wired or wireless manner.

On the other hand, the display apparatus 100, after the turn-on signal for turning on the power of the first peripheral device 300-1 is transmitted to the remote controller 200, determines whether content is received from the first peripheral device 300-1 within a predetermined threshold time. As a result, if it is determined that the content is received from the first peripheral device 300-1 within a predetermined threshold time, the display apparatus 100 updates the threshold time based on the time which is required from transmitting the turn-on signal until receiving the content from the first peripheral device 300-1.

In the meantime, if content is not received from the first peripheral device 300-1 within the predetermined threshold time, the display apparatus 100 display a UI for controlling the first peripheral device 300-1 on a screen.

Therefore, the user can refer to the UI displayed on the screen of the display apparatus 100 to determine whether the IR signal output from the remote control apparatus 200 is appropriate for the environment in which the first peripheral device 300-1 can receive the IR signal. The user presses an input button to turn on the first peripheral device 300-1 provided on the remote controller 200 or an input button to turn on the power of the first peripheral device 300-1 to turn on the first peripheral device 300-1.

On the other hand, the display apparatus 100, after transmitting a turn-on signal for turning on the power of the first peripheral device 300-1 to the remote controller 200, may receive content from the first peripheral device 300-1 after a predetermined threshold time. For example, it may be determined that the time when content is received from the first peripheral device 300-1 after the predetermined threshold time may be time before the UI for controlling the first peripheral device 300-1 is displayed on a screen of the display apparatus 100, as it is determined that content is not received from the first peripheral device 300-1.

As such, when the contents are received from the first peripheral device 300-1 after the predetermined threshold time, the display apparatus 100 may update the time which is required from transmitting the turn-on signal for turning on the first peripheral device 300-1 until receiving content from the first peripheral device 300-1 which is turned on by the IR signal to the remote controller 200 as the predetermined threshold time.

Figure 7:
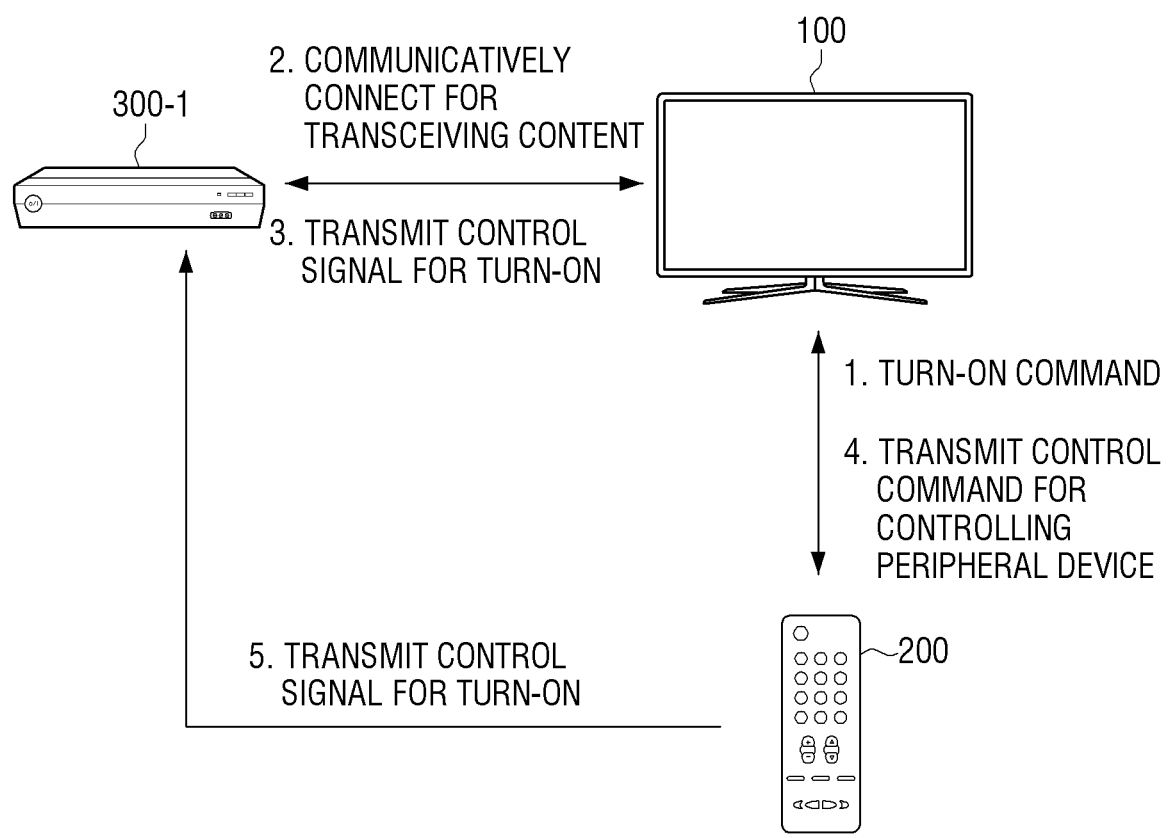
FIG. 7 illustrates controlling an operation of a peripheral device which provides content through a remote controller from a display apparatus according to another exemplary embodiment.

FIG. 7 illustrates controlling an operation of a peripheral device which provides content through a remote controller from a display apparatus according to another exemplary embodiment.

As illustrated in FIG. 7, while the display apparatus 100 is powered off, the remote controller 200 transmits a control signal relating to turning-on the display apparatus 100 through a local wireless communication module such as Bluetooth in accordance with a user command.

According to the control signal received from the remote controller 200, the display apparatus 100 boots its system. When the system booting is completed, the display apparatus 100 performs a communication connection for transmitting/receiving contents to/front the first peripheral device 300-1 to determine the power state of the first peripheral device 300-1. Here, the first peripheral device 300-1 may be a set-top box which receives content provided from a content server and outputs the content to the display apparatus 100.

Specifically, when the system booting is completed by turning on according to the con signal received from the remote controller 200, the display apparatus 100 checks whether the content is received within a predetermined threshold time from the first peripheral device 300-1 to determine the power state of the first peripheral device 300-1.

When content is not received within the predetermined threshold time, the display apparatus 100 determines that the first peripheral device 300-1 is powered off.

As such, when it is determined that the first peripheral device 300-1 is powered off, the display apparatus 100 generates a control signal to turn on the power of the first peripheral device 300-1 as shown in FIG. 7 and transmits the signal to the first peripheral device 300-1.

To be specific, the display apparatus 100 may be communicatively connected to the first peripheral device 300-1 through HDMI CEC. In this case, the display apparatus 100 may control the operation of the first peripheral device 300-1 through the HDMI CEC.

Therefore, the display apparatus 100, if it is determined that the first peripheral device 300-1 is powered off, generates a turn-on signal to turn on the first peripheral device 300-1 and transmits the signal to the first peripheral device 300-1 through the HDMI CEC.

Accordingly, the first peripheral device 300-1 performs a turn-on operation according to the control signal received through the HDMI CEC, and transmits content to the display apparatus 100 when the system is booted.

Meanwhile, the display apparatus 100 determines whether content is received from the first peripheral device 300-1 for a predetermined threshold time. As a result of the determination, if the content is received from the first peripheral device 300-1 for a predetermined threshold time, the display apparatus 100 updates the threshold time based on the time which is required from the time of transmitting a turn-on signal to the first peripheral device 300-1 through the HDMI CEC to receiving content from the first peripheral device 300-1.

Meanwhile, after the display apparatus 100 transmits a control signal for turning on the power of the first peripheral device 300-1 through the HDMI CEC, if content is not received from the first peripheral device 300-1 within a predetermined threshold time, the display apparatus 100 transmits a turn-on signal for turning on the power of the first peripheral device 300-1 to the remote controller 200. Accordingly, the remote controller 200 converts the turn-on signal received from the display apparatus 100 into an IR, signal and transmits it to the first peripheral device 300-1. Accordingly, the first peripheral device 300-1 performs a turn-on operation according to the IR signal received from the remote controller 200. When the system booting is completed according to the turn-on operation, the first peripheral device 300-1 transmits the content to the display apparatus 100.

In the meantime, the display apparatus 100, after transmitting a turn-on signal to turn on power of the first peripheral device 300-1 from the remote controller 200, determines whether content is received from the first peripheral device 300-1 within the predefined threshold time.

As a result, when content is received from the first peripheral device 300-1 within the predetermined threshold time, the display apparatus 100 updates the predetermined threshold time based on the time which is required from transmitting the turn-on signal to the remote controller 200 to receiving the content from the first peripheral device 300-1.

In the meantime, if content is not received from the first peripheral device 300-1 within the predetermined threshold time, the UI for controlling the first peripheral device 300-1 is displayed on a screen.

On the other hand, when the content is received from the first peripheral device 300-1 after a predetermined threshold time, the display apparatus 100 transmits a turn-on signal to turn on the power of the first peripheral device 300-1 to the remote controller 200 and then updates the time from transmitting the signal to receiving content from the turned-on first peripheral device 300-1 by the IR signal of the remote controller 200 as a predetermined threshold time.

The operation to display a UI for controlling the first peripheral device 300-1 on a screen or updating threshold time have been detailed in FIG. 6 and will not be further described.

Figure 8:
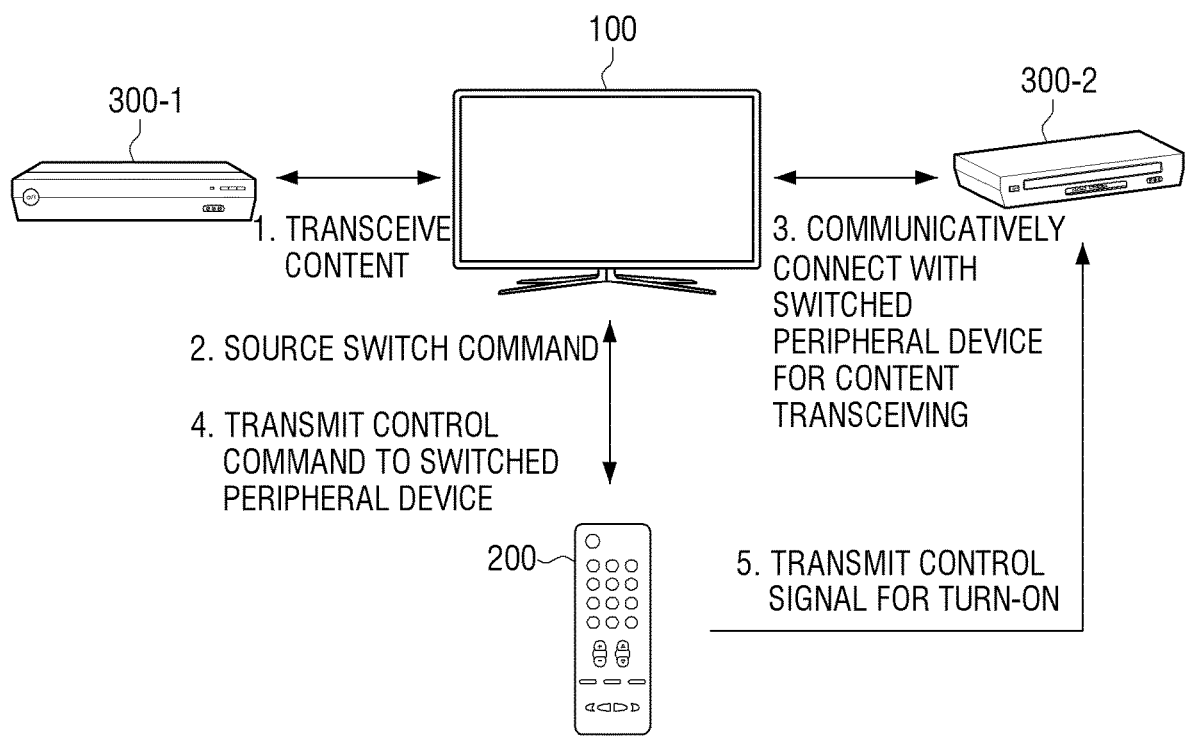
FIG. 8 illustrates controlling an operation of a peripheral device of which source is switched in a display apparatus according to an exemplary embodiment.

FIG. 8 illustrates controlling an operation of a peripheral device of which source is switched in a display apparatus according to an exemplary embodiment.

As illustrated in FIG. 8, the display apparatus 100 may be communicatively connected to the first and second peripheral devices 300-1, 300-2 in a wired or wireless manner. As shown in FIG. 8, the display apparatus 100 may be connected to the first and second peripheral devices 300-1 and 300-2 in a wired or wireless manner. The first peripheral device 300-1 may be a set-top box that receives content provided by a content server and outputs the content to the display apparatus 100. The second peripheral device 300-2 may be a content reproduction player that provides content recorded in the storage medium such as DVD.

The display apparatus 100 to which the first and second peripheral devices 300-1, 300-2 are communicatively connected can output contents provided from the first peripheral device 300-1.

In this state, while the content received from the first peripheral device 300-1 is being output, the remote controller 200 may receive a user co d for switching the source from the first peripheral device 300-2 to the second peripheral device 300-2. When the user command is input, the remote controller 200 transmits a control signal for switching the source through a local wireless communication module such as Bluetooth.

When the control signal is received, the display apparatus 100 stops outputting the contents of the first peripheral device 300-1 according to the control signal received from the remote controller 200, checks whether content is received from the second peripheral device 300-2 within a predetermined threshold time to determine the power state of the second peripheral device 300-2.

With respect to the second peripheral device 300-2, if content is not received within predetermined threshold time, the display apparatus 100 determines that the second peripheral device 300-2 is powered off.

If it is determined that the second peripheral device 300-2 is powered off, the display apparatus 100 transmits a turn-on signal for turning on the power of the second peripheral device 300-2 to the remote controller 200. Here, the control command transmitted to the remote controller 200 may be a value for outputting a control signal for turning on the power of the second peripheral device 300-2 as an IR signal in the remote controller 200.

Therefore, the remote controller 200, when a control command to turn on the power of the second peripheral device 300-2 is received from the display apparatus 100, converts the received turn-on signal to the IR signal and transmits the converted IR signal to the second peripheral device 300-2.

Accordingly, the second peripheral device 300-2 performs a turn-on operation according to the IR signal received from the remote controller 200. When the system booting is completed according to the turn-on operation, the second peripheral device 300-2 transmits content to the display apparatus 100 connected to the second peripheral device 300-2 in a wired or wireless manner.

On the other hand, the display apparatus 100 transmits a turn-on signal for turning on the power of the second peripheral device 300-2 from the remote controller 200, and determines whether or not the content is received from the peripheral device 300-2. If the content is received from the second peripheral device 300-2 within a predetermined threshold time with respect to the second peripheral device 300-2, the display apparatus 100 updates the predetermined threshold time to time from transmitting the turn-on signal to the remote controller 200 to receiving content from the second peripheral device 300-2.

Meanwhile, when content is not received from the second peripheral device 300-1 within the predetermined threshold time, the display apparatus 100 displays a UI for controlling the second peripheral device 300-2 on a screen.

Therefore, the user can refer to the UI displayed on the screen of the display apparatus 100 to determine whether the IR signal output from the remote control apparatus 200 is appropriate for the environment in which the second peripheral device 300-2 can receive the IR signal. The user presses an input button to turn on the second peripheral device 300-2 provided on the remote controller 200 or an input button to turn on the power of the second peripheral device 300-2.

For example, it may be determined that the time when content is received from the first peripheral device 300-1 after the predetermined threshold time may be time before the UI for controlling the first peripheral device 300-1 is displayed on a screen of the display apparatus 100, as it is determined that content is not received from the first peripheral device 300-1.

When the content is received from the second peripheral device 300-2 that has been source-switched after a predetermined threshold time, the display apparatus 100 may update the time which is required from transmitting the turn-on signal for turning on the first peripheral device 300-1 until receiving content from the first peripheral device 300-1 which is turned on by the IR signal to the remote controller 200 as the predetermined threshold time.

Figure 9:
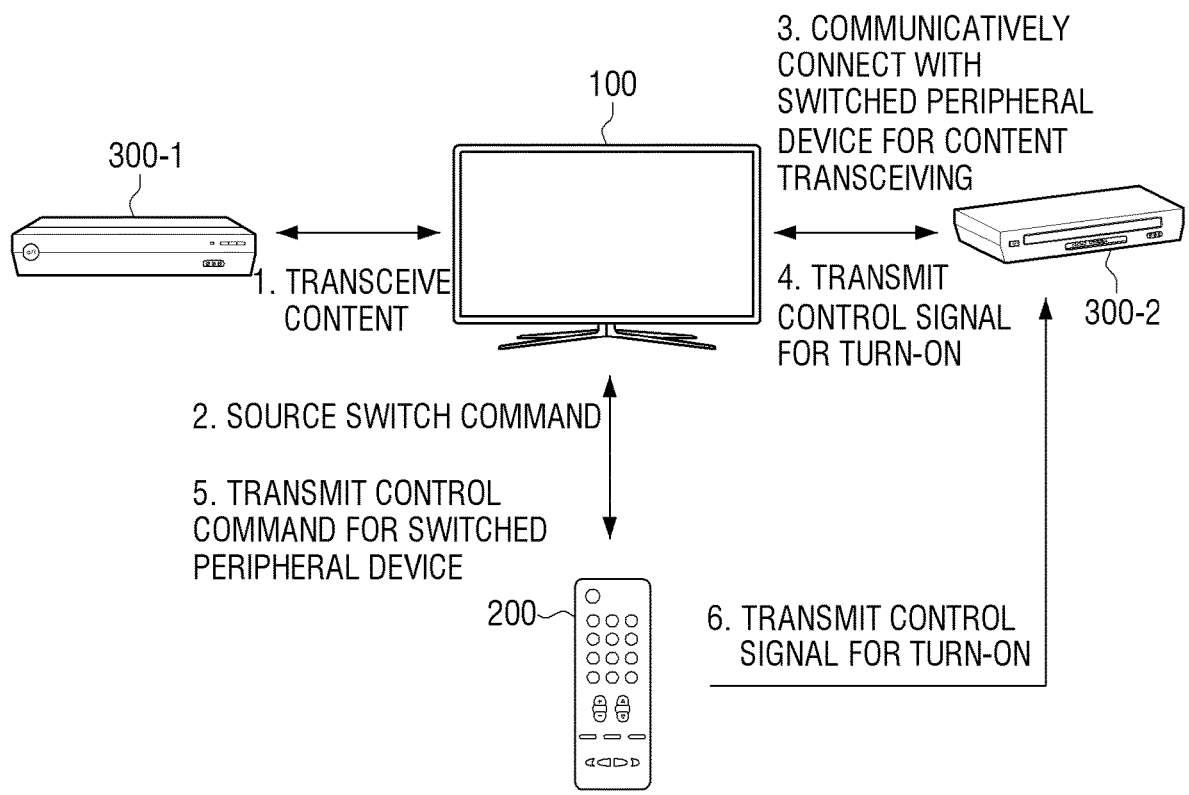
FIG. 9 illustrates controlling an operation of a peripheral device of which source is switched in a display apparatus according to another exemplary embodiment.

FIG. 9 illustrates controlling an operation of a peripheral device of which source is switched in a display apparatus according to another exemplary embodiment.

As illustrated in FIG. 8, the display apparatus 100 which is connected to the first and second peripheral devices 300-1, 300-2 in a wired or wireless manner may output content received from the first peripheral device 300-1.

As such, while the content received from the first peripheral device 300-1 is being output, the remote controller 200 may receive a user command for switching the source from the first peripheral device 300-1 to the second peripheral device 300-2. When the user command is input, the remote controller 200 transmits a control signal for switching the source through a local wireless communication module such as Bluetooth.

When the control signal is received, the display apparatus 100 stops outputting the contents of the first peripheral device 300-1 according to the control signal received from the remote controller 200, checks whether content is received from the second peripheral device 300-2 within a predetermined threshold time to determine the power state of the second peripheral device 300-2.

When content is not received from the source-switched second peripheral device 300-2 within the predetermined threshold time, the display apparatus 100 determines that the second peripheral device 300-2 is turned off.

As such, if it is determined that the second peripheral device 300-2 is powered off, the display apparatus 100 turns on the power of the second peripheral device 300-2, as shown in FIG. 9, and transmits the turn-on signal to the second peripheral device 300-2.

To be specific, the display apparatus 100 may be communicatively connected to the source-switched second peripheral device 300-2 through HDMI CEC. In this case, the display apparatus 100 may control operations of the second peripheral device 300-2 through HDMI CEC.

Accordingly, when it is determined that the second peripheral device 300-2 is powered off, the display apparatus 100 generates a control signal for turning on the power of the second peripheral device 300-2, and transmits the signal to the second peripheral device 300-2 through the HDMI CEC.

Accordingly, the second peripheral device 300-2 performs a turn-on operation according to a control signal received through the HDMI CEC, and when the system booting is completed according to the turn-on operation, transmits content to the display apparatus 100.

On the other hand, the display apparatus 100 transmits a turn-on signal for turning on the power of the second peripheral device 300-2 through the HDMI CEC, and determines whether or not the content is received from the second peripheral device 300-2 within the predetermined threshold time.

As a result of the determination, if the content is received from the second peripheral device 300-2 within a predetermined threshold time, the display apparatus 100 updates the threshold time based on a time interval between the time of transmitting a turn-on signal to the first peripheral device 300-2 through the HDMI CEC and the time of receiving content from the first peripheral device 300-2.

On the other hand, if the content is not received from the second peripheral device 300-2 within the predetermined threshold time, the display apparatus 100 transmits a turn-on signal for turning on the power of the second peripheral device 300-2 to the remote controller 200. Accordingly, the remote controller 200 switches the turn-on signal received from the display apparatus 100 into an IR signal and transmits the IR signal to the second peripheral device 300-2. Accordingly, the second peripheral device 300-2 performs a turn-on operation according to the IR signal received from the remote controller 200, and when the system booting is completed according to the turn-on operation, the content is transmitted to the display apparatus 100.

The display apparatus 100 transmits a turn-on signal to turn on the power of the second peripheral device 300-2 to the remote controller and determines whether content is received from the second peripheral device 300-2 within the predetermined threshold time.

As a result of the determination, when the content is received from the second peripheral device 300-2 within the predetermined threshold time, the display apparatus 100 updates the predetermined threshold time based on a time interval between the time of transmitting the turn-on signal to the remote controller 200 and the time of receiving the content from the second peripheral device 300-2.

In the meantime, if content is not received from the second peripheral device 300-2 within the predetermined threshold time, the UI for controlling the second peripheral device 300-2 is displayed on a screen.

On the other hand, when the content is received from the second peripheral device 300-2 after a predetermined threshold time, the display apparatus 100 transmits a turn-on signal to turn on the power of the second peripheral device 300-2 to the remote controller 200 and then updates the time from transmitting the signal to receiving content from the turned-on second peripheral device 300-2 by the IR signal of the remote controller 200 as a predetermined threshold time.

The operation to display a UI for controlling the second peripheral device 300-2 on a screen or updating threshold time have been detailed in FIG. 8 and will not be further described.

Figure 10:
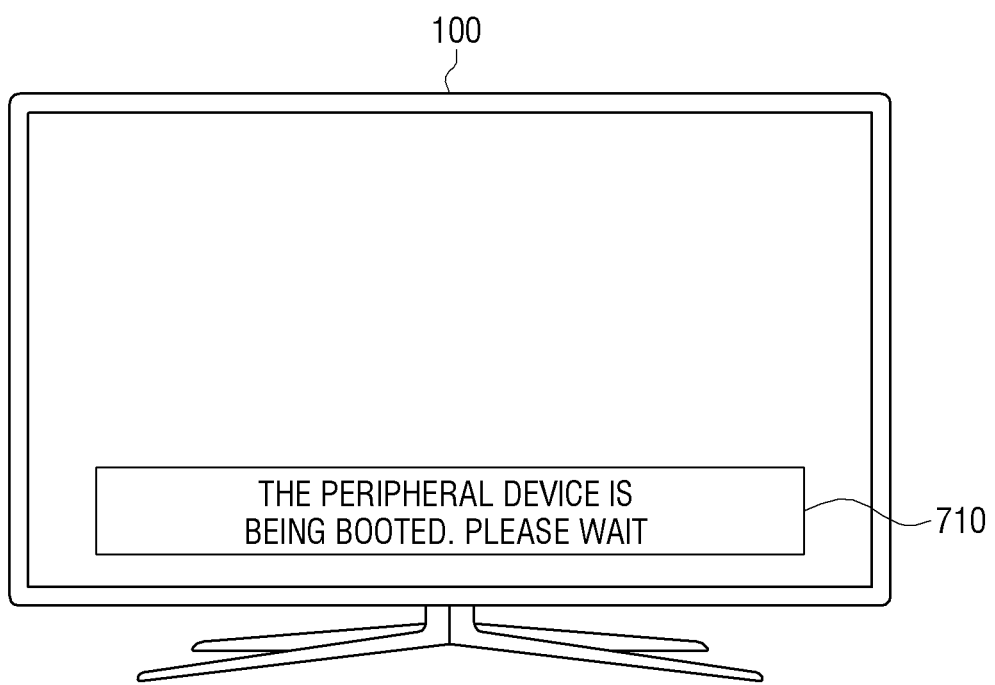
FIG. 10 illustrates a user interface (UI) indicating an operation state of a peripheral device in a display apparatus according to an exemplary embodiment.

FIG. 10 is an exemplary drawing which displays a UI indicating an operation state of a peripheral device in a display apparatus according to an exemplary embodiment.

As described above, the display apparatus 100, when it is determined that the first peripheral device 300-1 is powered off, transmits a turn-on signal for turning on the first peripheral device 300-1 to the remote controller 200.

Then, as shown in FIG. 10, until the content is received from the first peripheral device 300-1 turned on according to the control signal of the remote controller 200, the display apparatus 100 may display a UI 710, "THE PERIPHERAL DEVICE IS BEING BOOTED. PLEASE WAIT" on a screen.

That is, the display apparatus 100 transmits a turn-on signal for turning on the power supply of the peripheral device 300-1 to the remote controller 200, and then displays on a screen a UI 710 "The peripheral device is being booted. Please wait". Thereafter, when the content is received from the first peripheral device 300-1 turned on by the IR signal of the remote controller 200, the display apparatus 100 may remove the UI 710 "The peripheral device is being booted. Please wait" and output video content and audio received from the first peripheral device 300-1.

Figure 11:
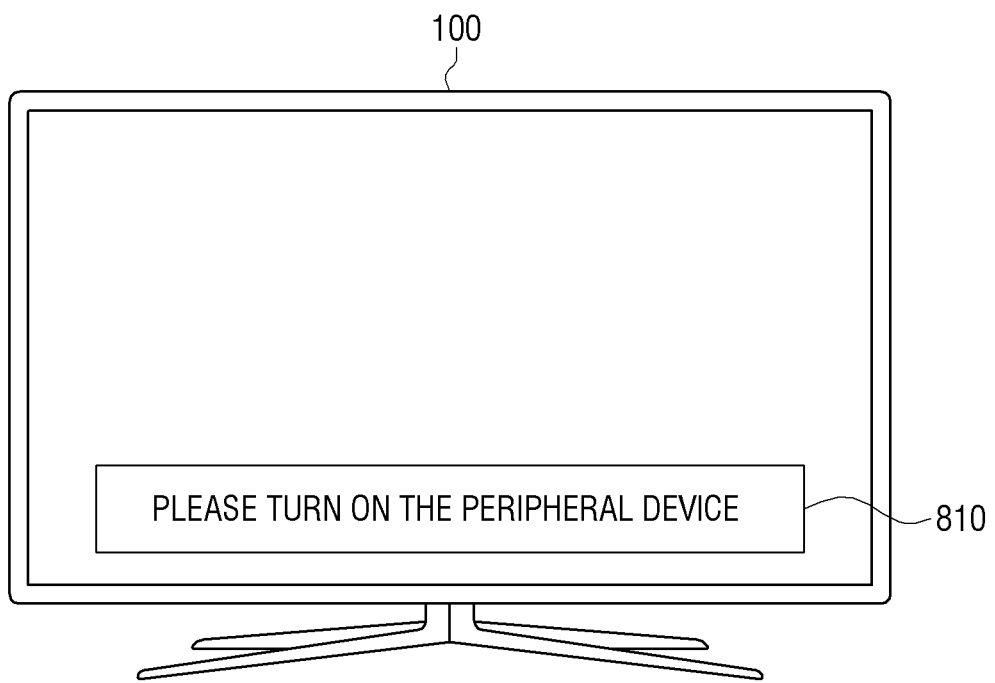
FIG. 11 illustrates a UI for controlling an operation of a peripheral device according to an exemplary embodiment.

FIG. 11 illustrates a UI for controlling an operation of a peripheral device according to an exemplary embodiment.

As described above, when the display apparatus 100 determines that the first peripheral device 300-1 is powered off, the display apparatus 100 transmits a turn-on signal for turning on the power of the first peripheral device 300-1 to the remote controller 200.

Accordingly, the remote controller 200 switches the turn-on signal received from the display apparatus 100 into an IR signal and transmits the IR signal to the first peripheral device 300-1. The first peripheral device 300-1 performs a turn-on operation according to the received IR signal to perform system boot. Then, when the system booting is completed, the first peripheral device 300-1 may transmit the content to the display apparatus 100, and output the content provided from the first peripheral device 300-1.

On the other hand, the display apparatus 100 transmits a turn-on signal for turning on the first peripheral device 300-1, which is determined to be turned off, and then determines whether content is received from the first peripheral device 300-1 during the predetermined threshold time.

For example, if the distance between the remote controller 200 and the first peripheral device 300-1 that is determined to be turned off is not within the predetermined range, or between the remote controller 200 and the first peripheral device 300-1, there may be obstacles. In this case, the power-off first peripheral device 300-1 may not receive the IR signal for turning on the first peripheral device 300-1 which is output from the remote controller 200.

When such an event occurs, the display apparatus 100 may determine that after transmitting a turn-on signal for turning on the first peripheral device 300-1 to the remote controller 200, the content is not received from the first peripheral device 300-1 within a predetermined threshold time.

If it is determined that the content is not received from the first peripheral device 300-1 within the predetermined time, the display apparatus 100 displays the UI 810 "PLEASE TURN ON THE POWER OF THE PERIPHERAL DEVICE" on the screen as illustrated in FIG. 11.

Therefore, the user can refer to the UI 810 displayed on the screen of the display apparatus 100 to determine whether the IR signal output from the remote control apparatus 200 is appropriate for the environment in which the first peripheral device 300-1 can receive the IR signal. The user presses an input button to turn on the first peripheral device 300-1 provided on the remote controller 200 or an input button to turn on the power of the first peripheral device 300-1 to turn on the first peripheral device 300-1.

Hereinbelow, a method of controlling operations of the first peripheral device 300-1 which provides content from the display apparatus 100 according to the present exemplary embodiment will be described in greater detail.

Figure 12:
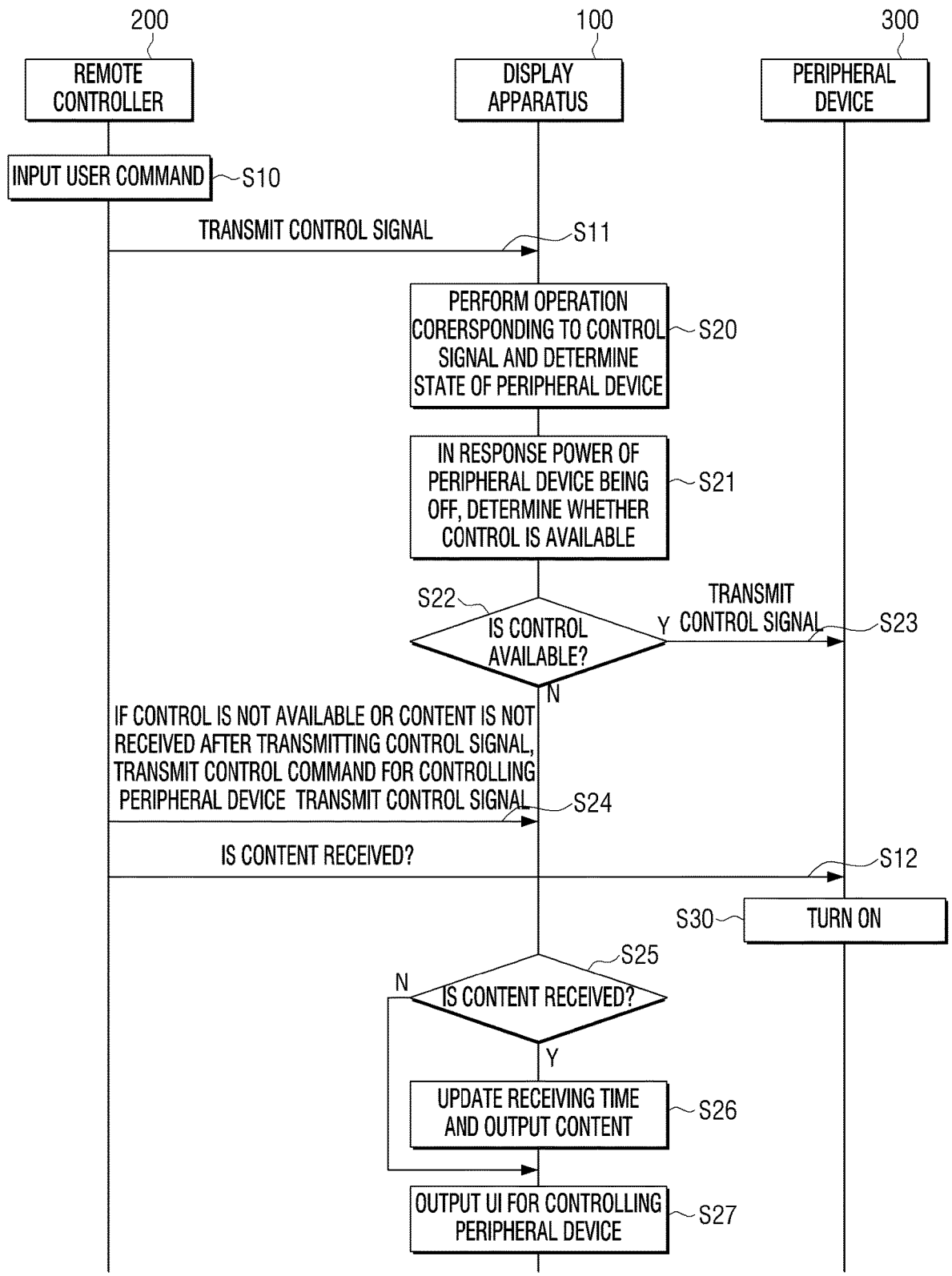
FIG. 12 illustrates a procedure map for controlling an operation of a peripheral device which provides content to a display apparatus according to an exemplary embodiment.

FIG. 12 is a procedure map for controlling an operation of a peripheral device which provides content to a display apparatus according to an exemplary embodiment.

As illustrated in FIG. 12, when the user command is input, the remote controller 200 transmits a control signal corresponding to the inputted user command to the display apparatus 100 through a local wireless communication module such as Bluetooth (operations S10 and S11).

When a predetermined control signal is received from the remote controller 200, the display apparatus 100 performs an operation corresponding to the received control signal, and then determines a power state of the first peripheral device 300-1 which is connected to the display apparatus 100 and provides content (operation S20).

According to one exemplary embodiment, the display apparatus 100 performs an operation corresponding to the control signal received from the remote controller 200, and then determines whether content is received from the first peripheral device 300-1 within a predetermined threshold time.

As a result of determination, if content is not received from the first peripheral device 300-1 within the predetermined threshold time, the display apparatus 100 may determine that the first peripheral device 300-1 is powered off.

According to another embodiment, the display apparatus 100 performs an operation corresponding to the control signal received from the remote control apparatus 200, and then compares the voltage value of the power supplied to the first peripheral device 300-1 and the threshold voltage value. As a result of the comparison, if the voltage value of the power supplied to the first peripheral device 300-1 is less than the predetermined threshold voltage value, the display apparatus 100 can determine that the first peripheral device 300-1 is powered off.

Through the exemplary embodiment, if it is determined that the first peripheral device 300-1 is powered off, the display apparatus 100 determines whether the first peripheral device 300-1 is controllable from the display apparatus 100 (operation S21).

According to the embodiment, the display apparatus 100 determines whether the first peripheral device 300-1 connected to the display apparatus 100 is communicatively connected through the HDMI CEC. As a result of the determination, when the first peripheral device 300-1 is connected to the HDMI CEC through the communication, the display apparatus 100 determines that the first peripheral 300-1 can be controlled, and transmits a control signal for turning on the first peripheral device 300-1 (operations S22, S23).

After transmitting the control signal for turning on to the peripheral device 300, if the content is not received from the first peripheral device 300-1 within a predetermined threshold time, the display apparatus 100 transmits a turn-on signal for turning on the first peripheral device 300-1 to the remote controller 200 (operation S24).

On the other hand, if it is determined in operation S22 that the display apparatus 100 cannot control the first peripheral device 300-1, the display apparatus 100 may transmit a turn-on signal for turning on the first peripheral device 300-1 to the remote controller 200.

Upon receiving the turn-on signal for turning on the first peripheral device 300-1, the remote controller 200 converts the received turn-on signal into an IR signal and transmits the IR signal to the first peripheral device 300-1. Accordingly, the first peripheral device 300-1 performs the system boot after performing the turn-on operation according to the IR signal received from the remote controller 200. Upon completion of the system boot, the first peripheral device 300-1 may transmit the content to the display device 100, which is communicatively connected to the first peripheral device 300-1.

On the other hand, the display apparatus 100 transmits a turn-on signal for turning on the power of the first peripheral device 300-1 to the remote controller 200, and then determine whether the content is received from the first peripheral device 300-1 which is turned on by the IR signal of the remote controller 200 within the predetermined threshold time (operation S25).

As a result of the determination, if the content is received from the first peripheral device 300-1 after the predetermined threshold time, the display apparatus 100 transmits a turn-on signal for turning on the power of the first peripheral device 300-1 to the remote controller 200 and updates the predetermined threshold time as the time taken until the content is received from the first peripheral device 300-1 (operation S26).

On the other hand, if the content is not received from the first peripheral device 300-1 after the predetermined threshold time, the display apparatus 100 displays a UI for controlling the first peripheral device 300-1 on the screen (operation S27).

Therefore, the user can refer to the UI displayed on the screen of the display apparatus 100 to determine whether the IR signal output from the remote control apparatus 200 is appropriate for the environment in which the first peripheral device 300-1 can receive the IR signal. The user presses an input button to turn on the first peripheral device 300-1 provided on the remote controller 200 or an input button to turn on the power of the first peripheral device 300-1 to turn on the first peripheral device 300-1.

Figure 13:
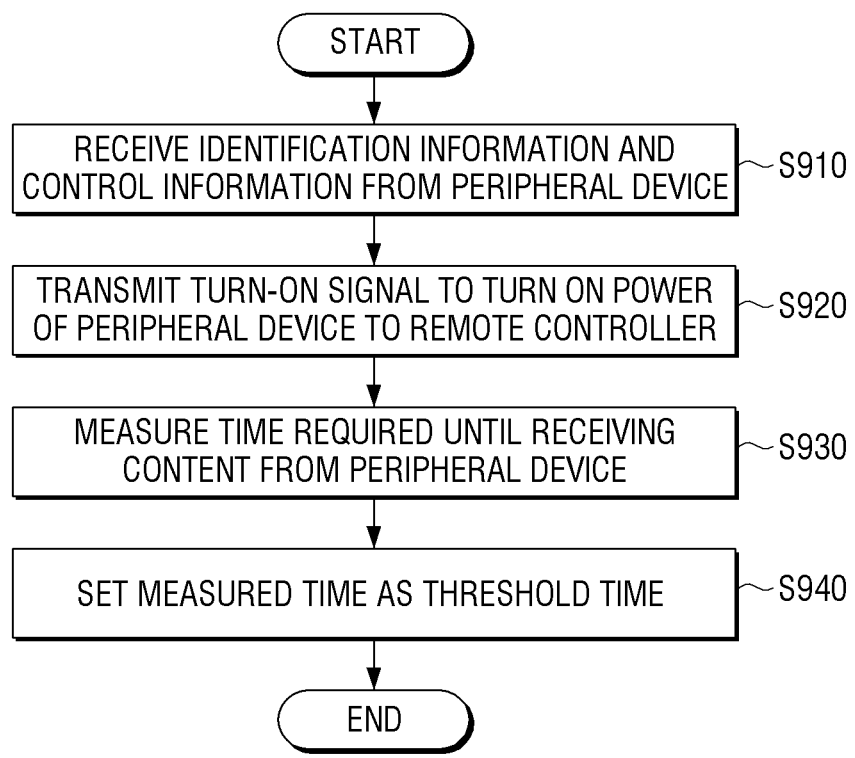
FIG. 13 illustrates setting a threshold time to determine whether content is received in a peripheral device that is connected to the display apparatus according to an exemplary embodiment.

FIG. 13 is an exemplary drawing fir setting threshold time to determine whether content is received in a peripheral device that is connected to the display apparatus according to an exemplary embodiment.

As illustrated in FIG. 13, when the initial communication with the first peripheral device 300-1 is started, the display apparatus 100 receives at least one of identification information from the first peripheral device 300-1 and control information for controlling the operation of the first peripheral device 300-1 (operation S910).

Then, the display apparatus 100, based on control information received from the first peripheral device 300-1, generates a turn-on signal for turning on power of the first peripheral device 300-1 and transmits the signal to the remote controller 200 (operation S920).

After that, the display apparatus 100 transmits a turn-on signal for turning on the power of the first peripheral device 300-1 to the remote controller 200, and then measures the time taken until the content is received from the first peripheral device 300-1 (operation S930).

After that, the display apparatus 100 sets threshold time to determine whether content is received from the first peripheral device 300-1 (operation S940).

Figure 14:
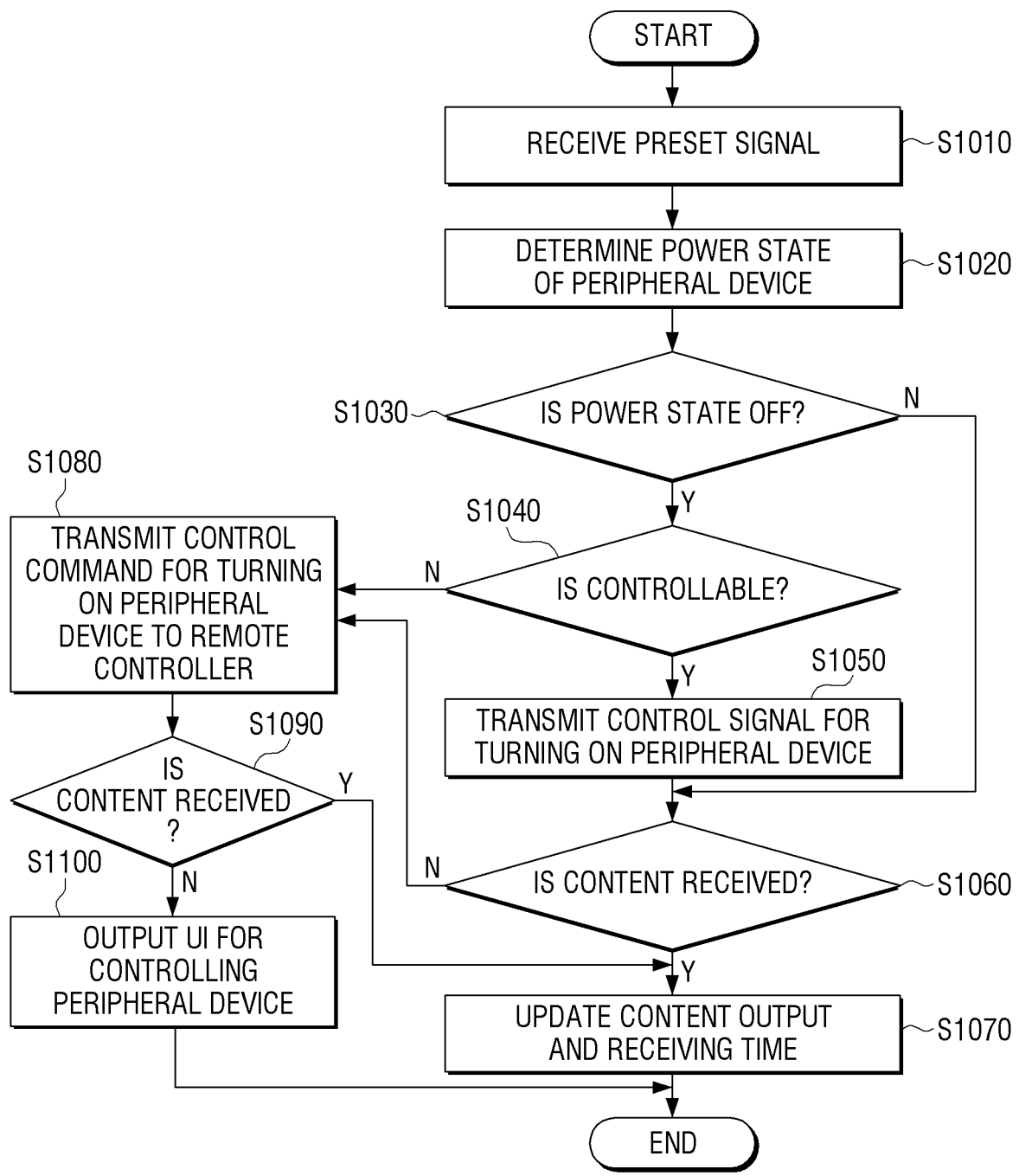
FIG. 14 illustrates a flowchart of a method for controlling an operation of a peripheral device which provides content to a display apparatus according to an exemplary embodiment.

FIG. 14 is a flowchart of a method for controlling an operation of a peripheral device which provides content in a display apparatus according to an exemplary embodiment.

As illustrated in FIG. 14, the display apparatus 100, when the predetermined signal is received from the remote controller 200, determines a power state of the first peripheral device 300-1 which is connected to the display apparatus 100 and provides content (operations S1010, S1020).

To be specific, the display apparatus 100, when the predetermined signal is received from the remote controller 200, performs an operation corresponding to the received signal. After that, the display apparatus 100 determines a power state of the first peripheral device 300-1 which is communicatively connected to the display apparatus 100.

According to one embodiment, after the predetermined signal is received, if the content is not received from the first peripheral device 300-1 within the predetermined threshold time with respect to the first peripheral device 300-1, the display apparatus 100 may determine that the first peripheral device 300-1 is powered off.

According to another embodiment, when the voltage value for the power supplied to the first peripheral device 300-1 is less than a predetermined threshold voltage value after the predetermined signal is received, the display apparatus 100 may determine that the peripheral device is turned off.

Through the embodiment, if it is determined that power of the first peripheral device 300-1 is off, the display apparatus 100 determines whether operation of the first peripheral device 300-1 which is powered off can be controlled by the display apparatus 100 (operations S1030, S1040).

According to the embodiment, when the display apparatus 100 communicates with the first peripheral device 300-1 through the HDMI CEC, the display apparatus 100 may determine that controlling the operation of the first peripheral device 300-1 is available.

As a result of the determination, when the display apparatus 100 and the first peripheral device 300-1 communicate with each other through the HDMI CEC, the display apparatus 100 transmits a control signal for turning on the power of the first peripheral device 300-1 to the first peripheral device 300-1 (operation S1050). Accordingly, the first peripheral device 300-1 performs the turn-on operation according to the control signal received from the display apparatus 100, and then performs the system boot. Then, when the system booting is completed, the first peripheral device 300-1 can transmit the content to the display apparatus 100.

Meanwhile, the display apparatus 100 transmits a control signal to the first peripheral device 300-1, and determines whether content is received within a predetermined threshold time from the first peripheral device 300-1 (operation S1060). As a result of the determination, if the content is received from the first peripheral device 300-1 within a predetermined threshold time, the display apparatus 100 outputs the video and audio of the received content (operation S1070). At this time, the display apparatus 100 may update the predetermined threshold time to the time taken from transmitting a control signal to the first peripheral device 300-1 and receiving content from the first peripheral device 300-1.

Meanwhile, in operation S1040, when the display apparatus 100 may not control the operation of the first peripheral device 300-1, the display apparatus 100 transmits a turn-on signal for turning on the first peripheral device 300-1 to the remote controller 200 (operation S1080).

In addition, when the display apparatus 100 transmits a control signal to the first peripheral device 300-1 in operation S1060 and the content is not received within a predetermined threshold time from the first peripheral device 300-1, the display apparatus 100 may transmit a turn-on signal for turning on the first peripheral device 300-1 to the remote controller 200.

Accordingly, the first peripheral device 300-1, after performing a turn-on operation according to the IR signal transmitted from the remote controller 200, performs system booting. Then, when system hooting is completed, the first peripheral device 300-1 may transmit content to the display apparatus 100. Accordingly, the remote controller 200 converts the turn-on signal received from the display apparatus 100 into an IR signal and transmits the IR signal to the first peripheral device 300-1. Accordingly, the first peripheral device 300-1 performs the turn-on operation according to the IR signal transmitted from the remote controller 200, and then performs the system boot. Then, when the system booting is completed, the first peripheral device 300-1 can transmit the content to the display apparatus 100.

On the other hand, the display apparatus 100 transmits a turn-on signal for turning on the power of the first peripheral device 300-1 to the remote controller 200, and then determines whether content is received from the first peripheral device 300-1 which is turned on by the IR signal of the remote controller 200 within the predetermined threshold time (operation S1090).

As a result of the determination, when the content is received from the first peripheral device 300-1 within the predetermined threshold time, the display apparatus 100 outputs the video and audio of the received content. At this time, the display apparatus 100 updates the time from transmitting a turn-on signal for turning on the power of the first peripheral device 300-1 to the remote controller 200 until receiving content from the first peripheral device 300-1 as the predetermined threshold time.

Meanwhile, when the content is not received from the first peripheral device 300-1 within the predetermined threshold time, the display apparatus 100 displays a UI for controlling the operation of the first peripheral device 300-1 on a screen (operation S1100).

Therefore, the user can refer to the UI displayed on the screen of the display apparatus 100 to determine whether the IR signal output from the remote control apparatus 200 is appropriate for the environment in which the first peripheral device 300-1 can receive the IR signal. The user presses an input button to turn on the first peripheral device 300-1 provided on the remote controller 200 or an input button to turn on the power of the first peripheral device 300-1 to turn on the first peripheral device 300-1.

On the other hand, the content may be received after a predetermined threshold time from the first peripheral device 300-1 turned on by the IR signal of the remote controller 200. For example, the time of receiving content from the first peripheral device 300-1 after the predetermined threshold time may be time until, as it is determined that content is not received from the first peripheral device 300-1 within the predetermined threshold time, the UI for controlling the first peripheral device 300-1 is displayed on a screen.

As described above, when the content is received from the first peripheral device 300-1 after the predetermined threshold time, the display apparatus 100 outputs the video and audio of the content received from the first peripheral device 300-1, as in the above-described operation S1070. At the same time, the display apparatus updates the time from transmitting a turn-on signal for turning on the power of the first peripheral device 300-1 to the remote controller 200 until receiving content from the first peripheral device 300-1 as the predetermined threshold time.

Meanwhile, the method for controlling the operation of the first peripheral device 300-1 in the above-described display apparatus 100 may be implemented as a program including an executable algorithm that can be executed in a computer, and the program can be stored in a non-transitory computer readable medium and provided.

Here, a program is stored in a non-transitory recording medium recordable by computer, and read and executed by computer, the exemplary embodiments of the present disclosure can be implemented.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A display apparatus comprising:
    a memory;
    a display;
    a communication interface configured to communicate with a peripheral device;
    a processor configured to store, in the memory, information about a threshold time associated with a boot time period of the peripheral device,
    start a timer when transmitting a turn-on signal to the peripheral device, the timer running until receiving a content signal from the peripheral device, and
    based on a time count according to the running timer exceeding the threshold time stored in the memory, control the display to display a user interface (UI) for controlling a power state of the peripheral device.

2. The display apparatus of claim 1, wherein the processor sets the time count as a threshold time for determining whether the peripheral device is turned on.

3. The display apparatus of claim 1, wherein the processor, in response to receiving a predetermined signal from a remote controller through the communication interface after the threshold time is set, determines a power state of the peripheral device, and in response to determining the power state of the peripheral device as a power off state, performs a control operation to turn on the peripheral device.

4. The display apparatus of claim 3, wherein in response to determining that the display apparatus is capable of controlling the peripheral device through high definition multimedia interface consumer electronics control (HDMI CEC), and the power state of the peripheral device is the power off state, the processor transmits a second turn-on signal to the peripheral device through the HDMI CEC, and determines whether the content signal is received from the peripheral device during the threshold time.

5. The display apparatus of claim 4, wherein in response to the content signal being received from the peripheral device during the threshold time, the processor updates the threshold time based on a time count according to the running timer starting when transmitting a second turn-on signal to the peripheral device until receiving the content signal, and stores the updated threshold time in the memory.

6. The display apparatus of claim 5, wherein the processor, in response to the content signal not being received from the peripheral device during the threshold time, transmits the second turn-on signal for turning on the peripheral device to the remote controller, determines whether the content signal is received from the peripheral device during the threshold time after the second turn-on signal is transmitted to the remote controller, and in response to the content signal being received from the peripheral device within the threshold time, updates the threshold time based on a time count according to the running timer starting when transmitting the second turn-on signal to the peripheral device until receiving the content signal, and stores the updated threshold time in the storage.

7. The display apparatus of claim 6, wherein the processor, in response to the content signal not being received from the peripheral device within the threshold time, controls the display to display the UI for controlling an operation of the peripheral device.

8. The display apparatus of claim 7, wherein the UI comprises a text message to cause a user to control the peripheral device to turn-on the peripheral device.

9. The display apparatus of claim 3, wherein the predetermined signal is one of a signal for turning on the display apparatus or a signal for switching a source device which provides the content signal to be outputted through the display apparatus.

10. A controlling method of a display apparatus for displaying content signal provided from a peripheral device, the method comprising:
- storing, in a memory, information about a threshold time associated with a boot time period of the peripheral device,
- starting a timer when transmitting a turn-on signal to the peripheral device until receiving a content signal from the peripheral device, and
- based on a time count according to the running timer exceeding the threshold time stored in the memory, controlling a display to display a user interface (UI) for controlling a power state of the peripheral device.

11. The controlling method of claim 10, further comprising:
- setting the time count as a threshold time for determining whether the peripheral device is turned on.

12. The controlling method of claim 11, further comprising:
- determining a power state of the peripheral device, in response to receiving a predetermined signal from a remote controller through the communication interface after the threshold time is set, and
- turning on the peripheral device, in response to determining the power state of the peripheral device as a power off state.

13. The controlling method of claim 12, wherein the turn-on signal is a first turn-on signal, and wherein the turning on the peripheral device comprises:
- in response to determining that the display apparatus is capable of controlling the peripheral device through high definition multimedia interface consumer electronics control (HDMI CEC), and the power state of the peripheral device is the power off state, transmitting a second turn-on signal to the peripheral device through the HDMI CEC, and
- determining whether the content signal is received from the peripheral device during the threshold time.

14. The controlling method of claim 13, further comprising:
- in response to the content signal being received from the peripheral device during the threshold time, updating the threshold time based on a time count according to the running timer starting when transmitting the second turn-on signal to the peripheral device until receiving the content signal.

15. The controlling method of claim 14, wherein the turning on the peripheral device comprises, in response to the content signal not being received from the peripheral device during the threshold time, transmitting the second turn-on signal for turning on the peripheral device to the remote controller,
wherein the method further comprises:
- determining whether the content signal is received from the peripheral device during the threshold time after the second turn-on signal is transmitted to the remote controller, and
- in response to the content signal being received from the peripheral device within the threshold time, updating the threshold time based on a time count according to the running timer starting when transmitting the second turn-on signal to the peripheral device until receiving the content signal.

16. The controlling method of claim 15, further comprising:
- in response to the content signal not being received from the peripheral device within the threshold time, controlling the display to display the UI for controlling an operation of the peripheral device.

17. The controlling method of claim 16, wherein the UI comprises a text message to cause a user to control the peripheral device to turn-on the peripheral device.

18. The controlling method of claim 12, wherein the predetermined signal is one of a signal for turning on the display apparatus or a signal for switching a source device which provides the content signal to be outputted through the display apparatus.

* * * * *